(12) United States Patent
Gastineau et al.

(10) Patent No.: US 7,689,501 B1
(45) Date of Patent: Mar. 30, 2010

(54) METHODS, SYSTEMS, AND COMPUTER PROGRAM PRODUCTS FOR MANAGING MULTIPLE INVESTMENT FUNDS AND ACCOUNTS USING A COMMON INVESTMENT PROCESS

(75) Inventors: Gary L. Gastineau, Short Hills, NJ (US); Todd J. Broms, New York, NY (US)

(73) Assignee: Managed ETFs LLC, Summit, NJ (US)

( * ) Notice: Subject to any disclaimer, the term of this patent is extended or adjusted under 35 U.S.C. 154(b) by 390 days.

(21) Appl. No.: 11/714,922

(22) Filed: Mar. 7, 2007

Related U.S. Application Data

(63) Continuation-in-part of application No. 11/141,243, filed on May 31, 2005, now Pat. No. 7,444,300.

(60) Provisional application No. 60/779,812, filed on Mar. 7, 2006.

(51) Int. Cl.
*G06F 17/00* (2006.01)
(52) U.S. Cl. ........................................ 705/37; 705/36 R
(58) Field of Classification Search .................. 705/35, 705/37
See application file for complete search history.

(56) References Cited

U.S. PATENT DOCUMENTS

| | | | |
|---|---|---|---|
| 5,806,048 A | 9/1998 | Kiron et al. | |
| 5,845,266 A | 12/1998 | Lupien et al. | |
| 5,946,667 A | 8/1999 | Tull et al. | |
| 5,983,204 A | 11/1999 | Debe | |
| 6,012,046 A | 1/2000 | Lupien et al. | |
| 6,029,146 A | 2/2000 | Hawkins et al. | |
| 6,088,685 A | 7/2000 | Kiron et al. | |
| 6,098,051 A | 8/2000 | Lupien et al. | |
| 6,236,972 B1 | 5/2001 | Shkedy | |
| 6,418,419 B1 | 7/2002 | Nieboer et al. | |

(Continued)

OTHER PUBLICATIONS

Berk, Jonathan B. and Richard C. Green, "Mutual Fund Flows and Performance in Rational Markets," Journal of Political Economy, vol. 112, No. 6, Dec. 2004, 1269-1295 (available at http://www.journals.uchicaqo.edu/JPE/journal/contents/v112n6.html). An earlier version (Dec. 2002) was published as an NBER working paper (available at http://papers.ssrn.com/so13/papers.cfm?abstractid=338881).

(Continued)

*Primary Examiner*—James A Kramer
*Assistant Examiner*—Paul Shumate
(74) *Attorney, Agent, or Firm*—Sterne, Kessler, Goldstein & Fox PLLC

(57) ABSTRACT

Described herein is an embodiment for administering two or more funds or one or more funds and one or more separate account portfolios, where each fund or portfolio is managed using a common investment process. The funds may have different management and distribution fees and may have different investor eligibility requirements. The fee structure may be accomplished through a fund of funds or holding company structure. Also described is an embodiment for investment management wherein funds and separate account portfolios using a common investment process exchange their shares or units and baskets of their securities to accommodate entry and exit of investors while protecting ongoing investors from the cost of such entries and exits and to accommodate investors paying different fees and expenses.

30 Claims, 18 Drawing Sheets

U.S. PATENT DOCUMENTS

| | | | |
|---|---|---|---|
| 6,601,044 B1 * | 7/2003 | Wallman | 705/36 R |
| 6,879,964 B2 | 4/2005 | Sauter et al. | |
| 6,941,280 B1 | 9/2005 | Gastineau et al. | |
| 7,024,387 B1 | 4/2006 | Nieboer et al. | |
| 7,047,218 B1 | 5/2006 | Wallman | |
| 7,099,838 B1 | 8/2006 | Gastineau et al. | |
| 7,305,362 B2 | 12/2007 | Weber et al. | |
| 7,444,300 B1 | 10/2008 | Broms et al. | |
| 2001/0025266 A1 | 9/2001 | Gastineau et al. | |
| 2002/0128947 A1 | 9/2002 | Sauter et al. | |
| 2002/0194107 A1 | 12/2002 | Li et al. | |
| 2003/0177077 A1 | 9/2003 | Weber et al. | |
| 2003/0177086 A1 | 9/2003 | Gomber et al. | |
| 2003/0177126 A1 | 9/2003 | Weingard et al. | |
| 2003/0233302 A1 | 12/2003 | Weber et al. | |
| 2004/0073506 A1 | 4/2004 | Tull, Jr. et al. | |
| 2004/0186803 A1 | 9/2004 | Weber et al. | |
| 2004/0210502 A1 | 10/2004 | Madhavan et al. | |
| 2004/0236636 A1 | 11/2004 | Lutnick et al. | |
| 2004/0243502 A1 | 12/2004 | Slowik et al. | |
| 2005/0187857 A1 | 8/2005 | Tull, Jr. et al. | |
| 2005/0216407 A1 | 9/2005 | Feldman et al. | |
| 2005/0262010 A1 | 11/2005 | Tull, Jr. et al. | |
| 2006/0026091 A1 | 2/2006 | Keen et al. | |
| 2006/0100955 A1 | 5/2006 | Baldassini et al. | |
| 2006/0167786 A1 | 7/2006 | Gambir et al. | |
| 2007/0027790 A1 | 2/2007 | Gastineau et al. | |

OTHER PUBLICATIONS

Beinstein, Peter, "What's It All About, Alpha?," Institutional Investor, May 2004, 48-52.

Chen, Joseph, Harrison Hong, Ming Huang and Jeffrey Kubik, "Does Fund Size Erode Performance? Liquidity, Organizational Diseconomies and Active Money Management," Working Paper, Sep. 2002 and May 2004 (available at http://www.rcf.usc.edu/~josephsc/files/fundsize.pdf).

Clark, Andrew, "For Benchmark-Beating Funds, Does Fund Size Affect Performance?", Lipper Research Study, Jan. 5, 2004 (available at http://www.research.lipper.wallst.com/researchStudiesOverview.asp).

Edelen, Roger M., Investor Flows and the Assessed Performance of Open-End Mutual Funds, Journal of Financial Economics 53,1999, 439-466.

Gastineau, Gary L., *The Exchange-Traded Funds Manual*, 2002b, John Wiley & Sons.

Gastineau, Gary L., "Protecting Fund Shareholders From Costly Share Trading," Financial Analysts Journal, May/Jun. 2004a, 22-32 (available at http://www.etfconsultants.com/Protecting%20Fund%20Shareholders%20FAJ.pdf).

Gastineau, Gary L. and Craig J. Lazzara, "Reinventing the Investment Fund" from *The Investment Think Tank: Theory, Strategy, and Practice for Advisers*. Harold Evensky and Deena Katz, editors, Bloomberg Press, 2004, 153-178. Also appeared in Bloomberg Wealth Manager under the title of "Extreme Makeover," Nov. 2004, 57-68.

Greene, Jason T., and Charles W. Hodges, "The Dilution Impact of Daily Fund Flows on Open-End Mutual Funds," *Journal of Financial Economics*, vol. 65, No. 1, Jul. 2002, 131-158.

Johnson, Woodrow T., "Predictable Investment Horizons and Wealth Transfers among Mutual Fund Shareholders," Journal of Finance, Oct. 2004, 1979-2012.

Porter, Michael, "The Future Is Now: The AMEX's Solution to the Active ETF Riddle," Lipper Fund Industry Insight Reports, Dec. 6, 2004, (available at http://www.research.lipper.wallst.com/fundIndustryOverview.asp; $15 payment required to view article).

Porter, Michael, "Gary Gastineau on Why Actively-Managed Exchange-Traded Funds Can Be the Greatest Thing Since Money Market Funds," Lipper Fund Industry Insight Reports, Nov. 30, 2004, (available at http://www.research.lipper.wallst.com/fundIndustryOverview.asp, $15 payment required to view article).

Securities and Exchange Commission, Concept Release Actively-Managed Exchange-Traded Funds, 17 CFR Part 270, Release No. IC-25258; File No. S7-20-011, Nov. 8, 2001 (available at http://www.sec.gov/rules/concept/ic-25258.htm).

Securities and Exchange Commission, Comments on Concept Release Actively-Managed Exchange-Traded Funds, 17 CFR Part 270, Release No. IC-25258; File No. S7-20-011 (available at http://www.sec.gov/rules/concept/s72001.shtml).

Comments of Paul Charbonnet, Investors FastTrack, Baton Rouge, La., Dec. 12, 2002 (available at http://www.sec.gov/rules/concept/s72001/pcharbonnet1.txt).

Comments of Pascal Redding, Jun. 6, 2002 (available at http://www.sec.gov/rules/concept/s72001/predding1.txt).

Comments of John White, May 4, 2002, (available at http://www.sec.gov/rules/concept/s72001/white1.txt).

Comments of R. Sheldon Johnson, Managing Director, Morgan Stanley & Co. Incorporated, May 3, 2002 (available at http://www.sec.gov/rules/concept/s72001/johnson1.htm).

Comments of Charles M. Bartlett Jr., May 2, 2002 (available at http://www.sec.gov/rules/concept/s72001/bartlett.txt).

Comments of Michael J. Ryan, Jr., Executive Vice President and General Counsel, The American Stock Exchange, LLC, Mar. 5, 2002 (available at http://www.sec.gov/rules/concept/s72001/ryan1.htm).

Comments of Stanley Keller, Chair, Committee on Federal Regulation of Securities; Diane E. Ambler, Chair, and Jay G. Baris, Vice-Chair, Subcommittee on Investment Companies and Investment Advisers, Section of Business Law of the American Bar Association, Feb. 1, 2002 (available at http://www.sec.gov/rules/concept/s72001/keller1.htm).

Comments of Robert M. Steele, Executive Vice President, Rydex Global Advisors Inc., Jan. 31, 2002 (available at http://www.sec.gov/rules/concept/s72001/steelel.htm).

Comments of Mike Schoren, Jan. 20, 2002 (available at http://www.sec.gov/rules/concept/s72001/schoren1.txt).

Comments of Gary L. Gastineau, Managing Director, Nuveen Investments, Jan. 14, 2002 (available at http://www.sec.gov/rules/concept/s72001/gastineau1.htm).

Comments of Joel Greenberg, Managing Director, Susquehanna International Group, Jan. 14, 2002 (available at http://www.sec.gov/rules/concept/s72001/greenberg1.htm).

Comments of Austin J. Fleites, Principal, State Street Bank and Trust Company, Jan. 14, 2002 (available at http://www.sec.gov/rules/concept/s72001/fleites1.htm).

Comments of Richard F. Morris, Senior Counsel, Barclays Global Investors, Jan. 11, 2002 (available at http://www.sec.gov/rules/concept/s72001/morris1.htm).

Comments of Ivar Bjornstad, President, Shoreland Partners LLC, Jan. 11, 2002 (available at http://www.sec.gov/rules/concept/s72001/bjornstadl.htm).

Comments of Kriya Inc., Jan. 8, 2002 (available at http://www.sec.gov/rules/concepts72001/goff1.htm).

Comments of Stacy W. Goff, Vice President and Assistant General Counsel, CenturyTel, Inc., Jan. 7, 2002 (available at http://www.sec.qov/rules/concept/s72001/goff.htm).

Stein, Jeremy C., Why Are Most Funds Open-End? Competition and the Limits of Arbitrage, Working Paper, Jan. 2004, Harvard University (available at http://post.economics.harvard.edu/faculty/stein/papers/OpenEndJanO4revision.pdf).

Broms et al., "Method and System for Improved Fund Investment and Trading Processes", U.S. Appl. No. 11/141,243, filed May 31, 2005.

Alexander et al., "Does Motivation Matter When Assessing Trade Performance? An Analysis of Mutual Funds", Working Paper, Feb. 28, 2006, 39 pgs.

"Standard & Poor's Depositary Receipts: SPDR Trust, Series 1 Prospectus" American Stock Exchange, http://www.amex.com/etfpros/SPDR.pdf, Jan. 26, 2007, 84 pgs.

Broms et al., "The Development of Improved Exchange-Traded Funds (ETFs) in the United States", The Brookings Institution, Sep. 12, 2006, 24 pgs.

Cremers et al., "How Active is Your Fund Manager? A New Measure that Predicts Performance" PowerPoint Presentation, Aug. 7, 2006, 36 pgs.

Gastineau, Gary L., *Someone Will Make Money on Your Funds—Why Not You? A Better Way to Pick Mutual and Exchange-Traded Funds* John Wiley & Sons, Inc., 2005, Chapter 10, "Reinventing the Mutual Fund: Actively Managed Exchange-Traded Funds", 18 pgs.

Gastineau, Gary L., "Reinventing the Mutual Fund: An Essential Piece of Financial Engineering" ETF Consultants, Working Paper, Feb. 25, 2005, 32 pgs.

Harlow et al., "The Right Answer to the Wrong Question: Identifying Superior Active Portfolio Management" Journal of Investment Management, vol. 4, No. 4, 2006, pp. 1-26.

Thirumalai, Ramabhadran S., "Active vs. Passive ETSs", Indiana University, Working Paper, Aug. 27, 2003, 41 pgs.

"Summary Judgment Ruling in *American Stock Exchange* vs. *Mopex, Inc.*" United States District Court, Southern District of New York 00 Civ. 5943 (SAS), Feb. 4, 2003, 23 pgs.

Wermers et al., "The Investment Value of Mutual Fund Portfolio Disclosure", Working Papers, Oct. 2006, 59 pgs.

"Global Investment Performance Standards (GIPS®)", CFA Institute Board of Governors, Feb. 4, 2005, 58 pgs.

Barney, Lee, "Actively Managed ETFs: Coming Soon to an Exchange Near You?", The Street, May 24, 2001, 4 pgs. (http://www.thestreet.com/funds/funds/1440520.htm1).

"Trading Strategies" Turbo Trade.com, http://www.turbotrade.com/content/view/116/94 (last reviewed Jul. 18, 2008).

Gastineau, Gary L., "Reinventing the Mutual Fund: An Essential Piece of Financial Engineering", ETF Consultants, Feb. 25, 2005, 32 pgs.

Sydney LeBlanc's article Did You Know Them?, published on Wall Street, Oct. 1, 2004, p. 1.

* cited by examiner

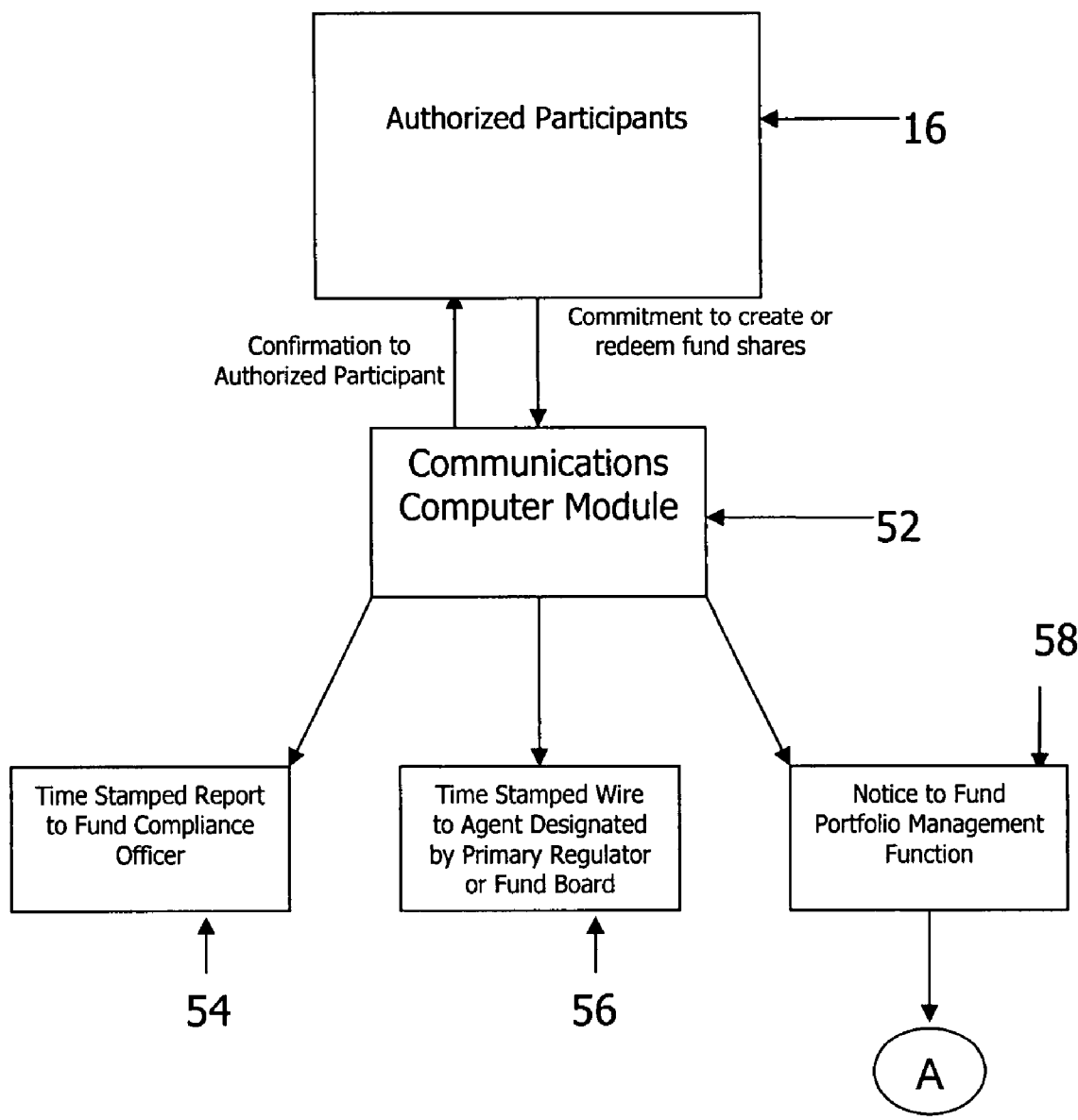

METHODS, SYSTEMS, AND COMPUTER PROGRAM PRODUCTS FOR MANAGING MULTIPLE INVESTMENT FUNDS AND ACCOUNTS USING A COMMON INVESTMENT PROCESS

CROSS REFERENCE TO RELATED APPLICATIONS

The present application claims priority to U.S. Provisional Patent Application No. 60/779,812, filed Mar. 7, 2006, and is a continuation-in-part of pending U.S. patent application Ser. No. 11/141,243, filed May 31, 2005, both of which are incorporated herein by reference in their entireties.

BACKGROUND OF THE INVENTION

1. Field of the Invention

The invention relates generally to financial services, and in particular, to the management and distribution of investment funds and separate accounts.

2. Background Art

In 1993, The American Stock Exchange ("AMEX") created the first ETF in the United States, SPDR ("SPY"), Standard & Poor's Depositary Receipts which represent ownership in the SPDR Trust Series 1, a unit investment trust holding the stocks in the Standard & Poor's 500 Composite Stock Price Index. Two other well known examples of ETFs also structured as unit investment trusts are: (i) Diamonds ("DIA"), Diamonds Trust Series 1 holding the equity securities included in the Dow Jones Industrial Average, and (ii) the Nasdaq 100 Index Tracking Stock ("QQQQ") which represents ownership in the Nasdaq 100 Trust holding the equity securities included in the Nasdaq 100 Index. Most other ETFs are organized as management investment companies with a structure and governance mechanism patterned after traditional mutual funds. All ETFs currently traded in the United States are designed and intended to provide investment results that, before expenses, generally correspond to the price and dividend yield performance of their respective index.

ETFs were originally established for investors to trade and hold diversified portfolios of marketable securities (stocks and/or fixed income securities) generally structured to correspond to a specific market index covering broad or narrow segments of a stock or bond market. Approximately 150 indexed ETFs were traded in the United States at the end of 2004.

Unlike open-end mutual funds and like all publicly traded stocks, ETF shares are structured to trade intra-day with the ease and liquidity of a share of stock, giving investors ownership of a portfolio through one security and the ability to purchase fund shares on margin and to sell them short. Currently available ETFs are generally low-cost funds because they are based on an index, and are not charged active management fees. The Securities and Exchange Commission ("SEC") has not yet allowed ETFs to be "actively managed," but has issued a Concept Release (SEC Release No. 1C-25258, Nov. 8, 2001, Actively-Managed Exchange-Traded Funds) and otherwise indicated a willingness to consider applications to issue such funds.

Pursuant to SEC exemptive orders, the currently available ETFs do not sell individual fund shares directly to investors as mutual funds do. In the generalized ETF creation and redemption process as described herein, ETFs issue and redeem their shares only in blocks (50,000 fund shares in the case of the SPY, for example) that are known as "Creation Units." The creation and redemption of ETF shares is done primarily by authorized participants (broker-dealers that have executed agreements with a fund's agents to create and redeem fund shares). Although a few funds authorize all cash creations and/or redemptions, authorized participants generally do not purchase or redeem Creation Units entirely for cash, but rather buy or sell Creation Units by delivering or receiving a basket of securities (plus or minus cash) that generally mirrors the portfolio of the ETF in a transaction facilitated by the fund's custodian and/or transfer agent. The authorized participants who purchase and redeem ETF Creation Units are predominantly market makers in the fund shares. After purchasing a Creation Unit, the authorized participant often splits it up and sells the individual shares on the secondary market, permitting other investors to trade in lots as small as an individual share.

Investors who want to sell their ETF shares have two options: (1) they can sell individual shares to other investors on the secondary market, or (2) they can sell Creation Units back to the ETF. ETFs generally redeem Creation Units in-kind by giving investors securities from the fund portfolio instead of cash. For example, the DIA ETF invested in the stocks in the Dow Jones Industrial Average (DJIA) would pay a redeeming shareholder by delivering some or all of the securities that constitute the DJIA. At its discretion, the fund may substitute cash for some or all of the securities in a creation or redemption transaction. To prevent investor confusion and because the redeemability of ETF shares is limited to Creation Units, ETFs may not call themselves mutual funds.

Mutual funds and ETFs are regulated primarily under the Investment Company Act of 1940, but are also subject to significant regulation under the Securities Act of 1933 and the Securities Exchange Act of 1934.

Unlike the ETFs available today, mutual funds are frequently actively managed. Like ETFs, mutual funds pool capital from many investors and invest in stocks, bonds, short-term money-market instruments, and other securities. Traditional and distinguishing characteristics of mutual funds are: (i) mutual fund shares are purchased by investors for cash, directly or through a broker or other intermediary, from the fund itself, rather than from other investors or market makers on a secondary market; (ii) the purchase price that investors pay for mutual fund shares is often the fund's per share net asset value (NAV); (iii) shareholder fees that the fund imposes at purchase (such as sales loads) may or may not be charged; (iv) mutual fund shares are usually redeemed at NAV for cash by the fund at the time of sale by the investor rather than being sold through and into the secondary market; (v) mutual funds generally sell and redeem their shares daily without limit, although some funds will stop selling new shares when they become large; and (vi) mutual fund operations and portfolios typically are managed by management companies known as investment advisers that are registered with the SEC.

Investment advisers receive management fees for managing the portfolio and operating the mutual fund. Some funds may also have sales charges or loads imposed in connection with a fund share sale or redemption or charges for distribution and service costs, commonly levied as 12b-1 fees, may be collected annually by the fund manager. Additionally, a mutual fund may offer different classes of shares with each class having different fees and expenses.

Early in September 2003, New York State's attorney general, Eliot Spitzer, announced a $40 million settlement with a hedge fund that had allegedly engaged in "late trading" and "market timing" with mutual funds. Late trading allegedly involved the hedge fund being permitted to buy and sell fund shares at the fund's 4:00 p.m. net asset value (NAV) several hours after the prices used in the NAV calculation were determined—a violation of U.S. SEC Rule 22c-1. Distinct from the transactions at "backward" prices were a number of market-timing trades initiated at or slightly before 4:00 p.m. In some cases, these trades may have taken advantage of "stale" prices in foreign or illiquid markets. In many cases, the market-timing trades created a need for the fund to trade during the following day's trading session. Any market impact cost of the next-day trades was borne by all the fund's shareholders.

There is strong evidence, apart from the recent publicity, that fund share orders coming to a fund late in the day is a common practice. These orders come from investors with motives far more diverse than market timing over a few days.

Since the Spitzer settlement called attention to these practices, the emphasis of most regulators and pundits has been on developing regulations to prevent improper trades based on stale prices or executed in violation of prospectus prohibitions against market timing. The problem with adding new regulations is that the abuses cited are possible only because the standard mutual fund pricing and trading processes are inherently flawed.

Most fund share trades that arrive late in the day are costly to existing fund shareholders no matter whether they were initiated by short-term traders or by ordinary investors. The cost to shareholders of fund orders entered at or just before the market close has been estimated as high as $40 billion a year. Orders the fund does not receive by early afternoon cost fund shareholders much more than simply the profits that some traders take away.

Last-minute fund buy orders frequently arrive on days when the market is strong near the close. Because orders to be executed at the market-on-close must be entered earlier, investors cannot buy the separate stock positions held by a typical equity fund at 4:00 p.m. closing prices by entering stock buy orders at 3:59 p.m: The investor can, however, buy shares in most funds a few seconds before 4:00 p.m. Just as an investor cannot execute stock trades at closing prices right before the NAV calculation, the fund cannot make an immediate trade for its portfolio at closing prices to invest the new cash. Whether they intend to get in and out quickly or to stay for years, many buyers of fund shares make last-minute purchases on days with a strong market at the close. If these buyers capture market momentum, their trades are particularly costly to their fellow fund shareholders because the fund will have to buy stocks at even higher prices on the next trading day to invest the cash inflow. Correspondingly, if a shareholder redeems fund shares with an order entered near 4:00 p.m., the fund will have to sell portfolio securities the next trading day, often at lower prices, to cover the redemption. The fund is thus providing free liquidity to these investors, and the fund's shareholders pay the cost of that liquidity. The cost of providing this liquidity is a permanent drag on the performance of the fund. It does not go away, even if the investor stays in the fund for many years. The net effect of the limited regulatory changes proposed in the wake of the scandals is to slightly reduce the nominal level of shareholder protection from the cost of late afternoon orders, offering false comfort to investors.

Studies of the impact of fund share trading offer compelling evidence that the costs to ongoing (non-trading) shareholders of providing free liquidity to trading shareholders are substantial. Roger M. Edelen (1999), then a professor at the Wharton School at the University of Pennsylvania, quantified the adverse effect of shareholder entry and exit costs on fund performance. Using a sample of 166 conventional (no-load) mutual funds ranging in type from small-capitalization to income funds, Edelen examined all purchases and sales of securities by the funds over a series of six-month periods. The six-month interval was determined by the reporting interval for mutual funds at the time of the study. Edelen broke down each fund's trading into flow (fund share turnover) and non-flow (portfolio composition changes) components. He measured how much of the flow-related trading was incremental trading resulting from the need to purchase and sell portfolio securities in response to the entry and exit of shareholders. His methodology revealed the cost of this trading, not the motives of the buying and selling shareholders. Edelen did not attribute a performance cost to flow trading if the manager was able to use the flow to make desired portfolio changes. He concluded that for the average fund in his sample, 30 percent of the flow into and out of the fund did not result in incremental trading and about half of the fund's total trading was flow related.

If 70 percent of flow resulted in incremental trading, then about 35 percent of total fund trading was incremental trading that resulted from providing liquidity to entering and leaving shareholders. The average fund Edelen studied was clearly not used aggressively by fund traders; aggressive trade timing can easily cause a rate of annual fund share turnover of several hundred percent. The modest flow and fund share turnover in Edelen's sample notwithstanding, the trading costs he attributed to the liquidity offered to entering and exiting shareholders accounted for an average net reduction in annual investor return of about 1.43 percent.

The 1.43 percent cost of providing liquidity to buyers and sellers of fund shares easily justifies a $40 billion annual minimum estimated performance cost of late-afternoon fund share orders. Recent figures show assets in U.S. stock and hybrid funds at about $4 trillion. Applying a conservative cost of providing liquidity of just 1 percent annually produces a $40 billion estimate of the cost/performance penalty that this feature of mutual funds costs the funds' shareholders.

Another problem with existing funds is the fact that most sizeable investment-management organizations offer a wide variety of products to investors. These investment products are theoretically managed independently because each portfolio is independent in composition. However, funds and other products with the same advisor are often managed under a common investment process and hold numerous securities in common. Furthermore, the investment manager has a responsibility to the beneficial holders of each portfolio or "separately managed" product to treat them fairly, when management of the products is partly integrated. Thus, when the firm embarks upon the purchase of a particular security or group of securities, the securities are often purchased for many or maybe even all of the manager's accounts or funds at about the same time. To manage conflicts of interest, many investment management organizations have developed techniques to handle purchases and sales for different accounts in a random sequence or rotation. The rotation is designed to assure that a particular account or group of accounts comes first on the list for some investment changes, in the middle for others and, inevitably, at the bottom of the list for still others. If the investment management organization has a trading desk that handles trades for all of the manager's accounts, the desk may calculate an average price and give each account the same average price with all accounts participating in trades over a longer period. The problem with these procedures is that each type of account that might hold a specific position has characteristics that cause its trading practices to reveal different amounts and kinds of information, almost at random, to other market participants while the trading moves through account categories or trades are allocated to all accounts over a period of a few weeks. An investment manager that manages only funds registered under the Investment Company Act of 1940 can preserve the value of investment information better than a manager that has a diverse product line.

Mediocre performance by most mutual funds has been attributed in part to a fund management incentive structure that encourages funds to accept all assets offered to them by potential shareholders. A management process capable of delivering superior performance for a small fund is often swamped with assets after a brief period of good performance. The manager makes more with a larger asset base, but shareholder performance is diluted by asset growth. Both shareholders and fund managers might benefit from a fund structure that caps asset growth and pays higher fees for managers that deliver superior results.

Although mutual funds are used by many investors including individuals, institutions, endowment funds, qualified retirement plans and others, mutual funds and their typical investment process are not generally designed to: (i) offer investors inherent protection from most of the abuses uncovered in the recent mutual fund trading scandals; (ii) minimize investor costs from fund share and portfolio turnover; (iii) require an efficient investment management process at the management company responsible for the selection of investments for a fund; (iv) provide an appropriate allocation of transaction costs between entering and leaving shareholders on the one hand and ongoing shareholders on the other hand; (v) allocate marketing and service costs appropriately among various groups or classes of fund shareholders; or (vi) protect the confidentiality of an investment manager's trading plans when the fund or funds are managed as part of a multi-product integrated investment process.

An investment manager can provide effective portfolio management to diverse investors most economically by using a common investment process for a variety of accounts. In practice, however, the integrity of the investment process is often compromised by managing some assets in a fund where position disclosure is deferred and other assets in separate accounts where positions and position changes may be disclosed at or before the time trades occur. Current securities laws and regulations in the United States can make it difficult or inefficient for an investment manager to offer a common investment process to investors that have similar investment objectives, but are accustomed to paying different investment management fees and expenses. Overcoming these obstacles and use of a common investment process for different types of investors has economic value and performance advantages for an investment manager and its clients, including mutual funds, exchange-traded funds, unit trusts, closed-end funds and investors with interests in a variety of types of separate accounts.

Investment managers frequently offer similar portfolios to their clients through diverse vehicles such as investment companies, including mutual funds, exchange-traded funds (such as those described above), unit trusts, closed-end funds and separate accounts. The separate accounts may include pooled and non-pooled accounts offered by insurance companies and banks and non-pooled accounts offered by brokerage firms and other financial intermediaries. Unfortunately, serving diverse clients within a single investment process often leads to inappropriate revelations of trading plans, and such revelations may be detrimental to performance achieved for all clients of the investment manager. Record-keeping and maintaining both trading confidentiality and fair trade allocation for numerous similar accounts with separate portfolios is often costly and complex using current techniques.

Separate accounts may also include relatively large customized accounts for a single client and pooled accounts serving institutional and individual investors directly or embedded in variable annuities or variable life insurance contracts. Further, the separate accounts may include what are known as separately managed accounts (SMAs) that are offered by investment managers, often through an intermediary such as a brokerage firm, to individual investors. SMAs are not generally pooled accounts. Each SMA typically has a single owner or joint ownership by two or more members of a family. The suitability of each of the separate account variations for integration in a common investment process with funds and with other separate accounts depends on the confidentiality of its portfolio management and trade execution processes. Some separate account variations do not meet appropriate confidentiality standards for integration with other accounts in a common investment process.

There is, therefore, a need for methods, systems, and computer program products that bring all investors into efficient accounts while preserving the integrity of the investment process, that treat all investors equitably in the execution of transactions to change portfolio composition, and that protect ongoing investors from transaction costs incurred to accommodate entering and leaving investors. Further, there is a need to improve confidentiality and fairness of trade execution and allocation, while simultaneously reducing expenses and providing improved investor protection from transaction costs incurred in accommodating clients that bring assets into or remove assets from the manager's investment process.

BRIEF SUMMARY OF THE INVENTION

These needs and others may be met by the present invention, one embodiment of which uses two or more funds with similar portfolios to exchange segments of their similar portfolios for fund shares. Another embodiment uses funds and one or more separate accounts to exchange portfolio components for fund shares.

Another embodiment uses holding companies or funds of funds that hold shares in one or more funds and other financial instruments. This implementation may be used to accommodate investors who wish to compensate their adviser in specific ways. Other methods of interaction between and among funds and separate accounts are possible. These components and features may be used either individually or in a variety of combinations to achieve the objectives of protecting fund shareholders from the costs of providing liquidity to fund share traders and increasing the effectiveness and confidentiality of the portfolio management process.

The invention includes another embodiment for investment management involving a fund and at least one separate account using the investment process to select similar portfolios, where the fund and the at least one separate account have different management and/or distribution fees. Some investors can exchange shares of the fund for an interest in the at least one separate account. The at least one separate account can exchange the fund shares with the fund for portfolio financial instruments of the fund. Furthermore, some investors can exchange a representative basket of the separate account's portfolio of financial instruments for shares of the fund and the fund can exchange its shares with the at least one separate account for portfolio financial instruments of the at least one separate account.

It is to be understood that both the foregoing general description and the following detailed description are not limiting, but are intended to provide further explanation of the invention claimed. The accompanying drawings which are incorporated in and constitute part of the specification are included to illustrate and provide a further understanding of the method and system of the invention. Together with the description, the drawings serve to explain the principles of the invention.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

FEATURES OF THE INVENTION

The present invention, as described herein in its various embodiments, may be characterized by the following features and advantages. Embodiments of the invention may include any combination of features recited below, as well as others described herein.

1. A computer-implemented method using separate and coupled computerized portfolio management and accounting systems at one or more locations to integrate portfolio composition, market risk exposure and asset distribution among investment accounts; and to administer a multiple investment portfolio operation and financial products to provide investment management services to two or more investors, the method and structure comprising:

investors holding beneficial interests in similar underlying portfolios through two or more open-end investment management companies;

investor entry to and exit from a portfolio accomplished in a manner designed to protect ongoing investors that are not transacting from the transaction costs associated with entry and exit of investors; and a common investment process across portfolios.

2. The method of claim 1 wherein public disclosure of portfolio composition changes that are underway is restricted.

3. The method of claim 2 wherein the disclosure is deferred until the earlier of the time the changes have been implemented in all portfolios or the time disclosure is required by regulatory authorities.

4. The method of claim 1 wherein an open-end investment management company portfolio protected from transaction costs associated with entry and exit of investors is used to present a more accurate measure of the performance of the investment manager's investment process than a composite of accounts without such protection would provide.

5. The method of claim 1 wherein at least one open end investment management company is an open-end exchange-traded fund.

6. The method of claim 1 wherein at least one open end management investment company is an open-end mutual fund.

7. The method of claim 1 wherein at least one investment company is a closed-end fund.

8. The method of claim 1 wherein one or more sub-advisors manage part or all of the portfolios.

9. The method of claim 1 wherein one or more management functions are performed by one or more unaffiliated entities.

10. The method of claim 1 wherein one or more investors or groups of investors directly or indirectly incur different net fees or expenses than one or more other investors or groups of investors.

11. The method of claim 10 wherein certain large investors receive a promotional fee either directly or as a rebate of a fee.

12. The method of claim 10 wherein certain large investors receive a discount on a fee.

13. The method of claim 1 wherein purchases and redemptions of portfolio interests are effected by delivering or receiving shares of an exchange-traded fund.

14. The method of claim 13 wherein one exchange-traded fund may accept the shares of another exchange-traded fund to purchase its shares or may deliver shares of another exchange-traded fund to make redemption payments to its investors.

15. The method of claim 1 wherein two or more funds with similar portfolio compositions exchange baskets of portfolio securities or cash or a combination to accommodate entering or leaving investors.

16. The method of claim 15 wherein the portfolio positions exchanged reflect the actual composition of the portfolios of the funds involved in the exchange rather than the contents of a posted creation or redemption basket.

17. The method of claim 15 wherein the portfolio positions exchanged are not the size of a standard exchange-traded fund creation unit.

18. The method of claim 1 wherein at least one open end investment management company is an open-end holding company or open-end fund of funds holding shares in one or more other funds.

19. The method of claim 18 wherein fractional shares are issued and redeemed by one or more open-end holding companies or open end funds of funds 20. The method of claim 18 wherein dollar-denominated transactions are accommodated by one or more open-end holding companies or open-end funds of funds.

21. The method of claim 18 wherein an in-kind redemption process is used by one or more holding companies or one or more funds of funds.

22. The method of claim 18 wherein the management of the open-end holding company or the open-end fund of funds is not affiliated with the investment advisor or under the supervision of the board of a fund, or funds held in the portfolio of the holding company or fund of funds.

23. The method of claim 1 wherein one or more of the portfolios may accommodate entry and exit of investors for cash with the transaction costs of accommodating the purchase or sale paid by the entering or leaving investor(s).

24. A computer-implemented method using separate and coupled computerized portfolio management and accounting systems at one or more locations to integrate portfolio composition, market risk exposure and asset distribution among investment accounts; and administer a multiple investment portfolio operation and financial products to provide investment management services to two or more investors, the method and structure comprising;

investors holding beneficial interests in similar underlying portfolios through one or more open-end investment management companies and one or more separate accounts;

investor entry to and exit from a portfolio accomplished in a manner designed to protect ongoing investors that are not transacting from the transaction costs associated with entry and exit of investors; and a common investment process across portfolios 25. The method of claim 24 wherein public disclosure of portfolio composition changes that are underway is restricted.

26. The method of claim 25 wherein the disclosure is deferred until the earlier of the time the changes have been implemented in all portfolios or the time disclosure is required by regulatory authorities.

27. The method of claim 24 wherein an open-end investment management company portfolio protected from transaction costs associated with entry and exit of investors is used to present a more accurate measure of the performance of the investment manager's investment process than a composite of accounts without such protection would provide.

28. The method of claim 24 with disclosure of portfolio changes deferred until the changes have been implemented in all portfolios.

29 The method of claim 24 wherein at least one investment company is an open-end exchange-traded fund.

30. The method of claim 24 wherein at least one investment company is an open-end mutual fund.

31. The method of claim 24 wherein at least one investment company is a closed-end fund.

32. The method of claim 24 wherein one or more sub-advisors manage part or all of the portfolios.

33. The method of claim 24 wherein one or more management functions are performed by one or more unaffiliated entities.

34. The method of claim 24 wherein one or more investors or groups of investors directly or indirectly incur different net fees or expenses than one or more other investors or groups of investors.

35. The method of claim 34 wherein certain large investors are paid a promotional fee either directly or as a rebate of a fee.

36. The method of claim 34 wherein certain large investors receive a discount on a fee.

37. The method of claim 24 wherein purchases and redemptions of portfolio interests are effected by delivering or receiving shares of an exchange-traded fund.

38. The method of claim 37 wherein one exchange-traded fund may accept the shares of another fund to purchase its shares or may deliver shares of another fund to make redemption payments to its investors.

39. The method of claim 24 wherein one or more funds and one or more separate accounts with similar portfolio compositions exchange baskets of portfolio securities or cash or a combination to accommodate entering or leaving investors.

40. The method of claim 39 wherein the portfolio securities exchanged reflect the actual composition of the portfolios involved in the exchange rather than the contents of a posted creation or redemption basket.

41. The method of claim 39 wherein the portfolios exchanged are not the size of a standard exchange-traded fund creation unit.

42. The method of claim 24 wherein at least one investment company is an open-end holding company or open-end fund of funds holding shares in one or more other funds.

43. The method of claim 42 wherein fractional shares are issued and redeemed by one or more open-end holding companies or one or more open-end funds of funds.

44. The method of claim 42 wherein dollar-denominated transactions are accommodated by one or more open-end holding companies or open-end funds of funds.

45. The method of claim 42 wherein an in-kind redemption process is used by one or more holding companies or one or more funds of funds.

46. The method of claim 42 wherein the management of the open-end holding company or the open-end fund of funds is not affiliated with the investment adviser or under the supervision of the board of a fund or funds held in the portfolio of the holding company or fund of funds.

47. The method of claim 24 wherein one or more of the portfolios may accommodate entry and exit of investors for cash, the transaction costs of accommodating the purchase or sale paid by the entering or leaving investor(s).

48. A computer-implemented method using separate and coupled computerized share accounting systems at one or more locations to provide customized access to exchange-traded fund shares for investors using a different distribution method and a different fee structure than the standard for exchange-traded funds;

wherein one or more management functions are provided by one or more affiliated or unaffiliated entities.

49. The method of claim 41 wherein one or more investors or groups of investors directly or indirectly incur different net fees or expenses than one or more other investors or groups of investors.

50. The method of claim 49 wherein certain large investors receive a promotional fee either directly or as a rebate of a fee.

51. The method of claim 49 wherein certain large investors receive a discount on a fee.

BRIEF DESCRIPTION OF THE DRAWINGS/FIGURES

The accompanying drawings, which are incorporated in and constitute part of the specification illustrate embodiments of the invention and, together with the general description given above and a detailed description of the embodiments given below, serve to explain the principles of the present invention.

FIG. 2A is a flow diagram of the communications and control system used to implement and ensure compliance with early creation-redemption cut-off time notification requirements;

DETAILED DESCRIPTION OF THE INVENTION

Figure 1:
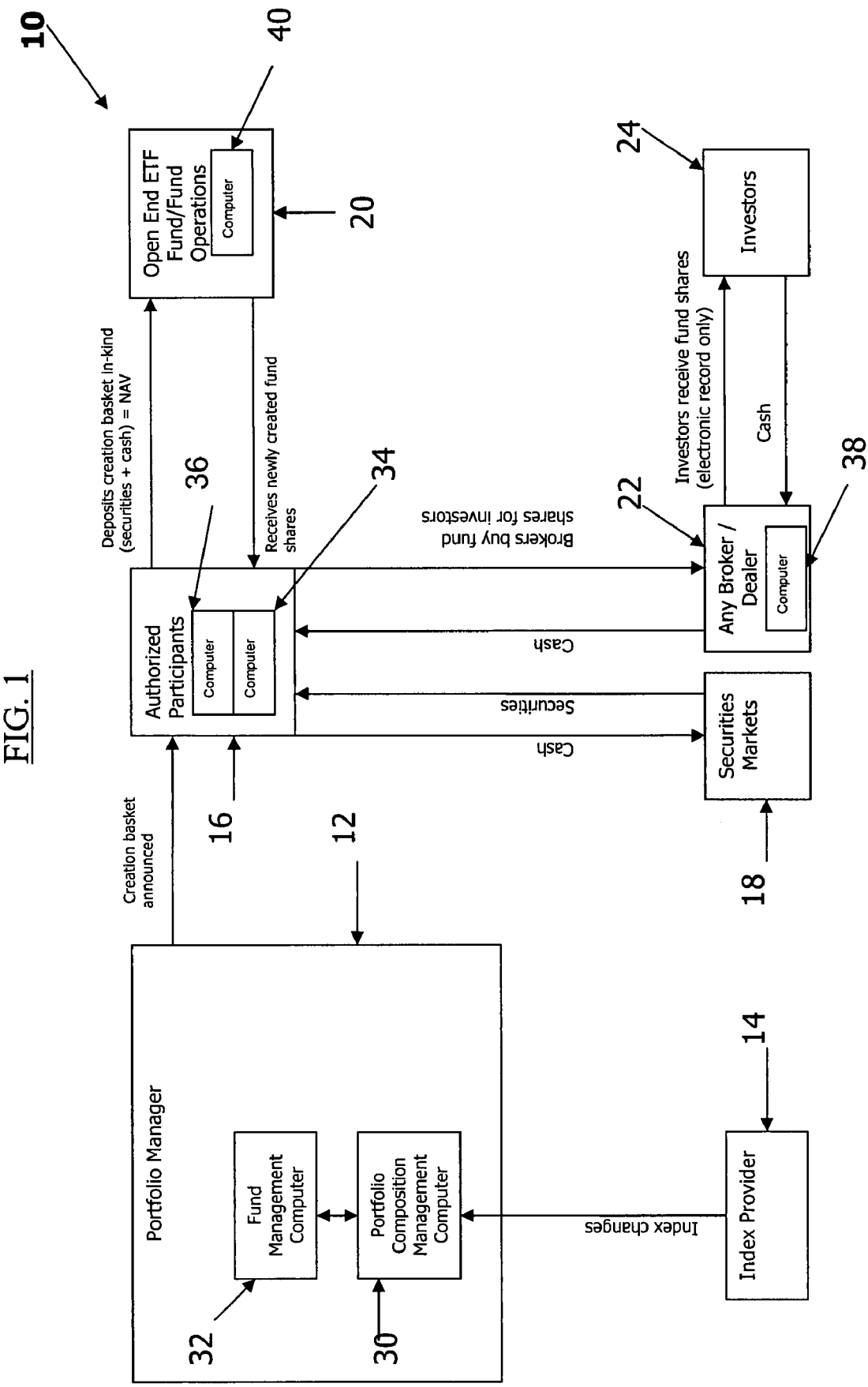
FIG. 1 is a block diagram of the systems used in the creation process for actively-managed exchange-traded funds (AMETFs, and improved indexed ETFs) according to the present invention.

The present invention, as described below, may be implemented in many different embodiments of software, hardware, firmware, and the entities illustrated in the figures. Any actual software code with a specialized control of hardware to implement the present invention is not limiting to the present invention. Thus, the operational behavior of the present invention will be described with the understanding that modifications and variations of the embodiments are possible, given the level of detail presented herein.

Example 1

Methods and Systems for Improved Fund Investment and Trading Processes

The preferred embodiment consists of major and several subsidiary components implemented through a variety of separate and related computer systems for the fund. These components may be used either individually or in a variety of combinations to achieve the joint objectives of protecting fund investors from the costs of providing liquidity to fund share traders, increasing the effectiveness of the portfolio management process and providing a new and improved way to trade exchange-traded fund shares on a secondary market. A number of the components of the preferred embodiment have more than one effect (e.g., shareholder protection plus improved portfolio management procedures). Each component can be implemented separately and is generally beneficial to fund shareholders even if the other components are not implemented at the same time or to the full extent described herein.

Certain components of the preferred embodiment improve expected performance and offer other advantages for investors in both AMETFs with a full active management investment process and a new kind of indexed ETF. This new kind of indexed ETF uses traditional indexing techniques but the index composition changes are not disseminated to the marketplace until after the fund portfolio manager has had an opportunity to change the fund portfolio to reflect any index changes. For the protection of investors, the portfolios of these new index funds are less transparent than the portfolios of existing benchmark index ETFs, but these funds are otherwise similar to other indexed ETFs. These funds can benefit from the same components of the present invention as the fully active AMETFs principally described herein. Consequently, these new index funds are covered by the description and claims as an AMETF variant. The Securities and Exchange Commission has indicated that these new index funds will be considered actively-managed funds for regulatory purposes. The secondary market trading system that is a component of the preferred embodiment is a useful method for secondary market trading of any securities basket product including existing ETFs, HOLDRs (trust-issued receipts that represent beneficial ownership of a specified group of stocks), BLDRs (unit investment trust portfolios of publicly traded Depositary Receipts) and structured notes linked to a multi-security index or basket as well as the AMETFs described herein.

In this Application, the ETF Share Class is sometimes referred to as the General Class of Fund Shares or Redeemable Shares to emphasize specific characteristics. The terms are interchangeable. A Business Day is any day the securities markets are open. Ordinarily a Business Day ends at 4:00 p.m. Eastern Time in United States securities markets, but some or all markets may close earlier on occasion, usually on the day before a holiday.

Features of the Preferred Embodiment That Primarily Protect Investors from Costs of Fund Share Trading 1. Early cut-off times for orders to purchase and redeem AMETF and ETF shares.

2. Entry and exit of investors through an ETF Share Class or an equivalent process to protect ongoing shareholders from the cost of providing liquidity to fund share traders.

Features of the Preferred Embodiment That Primarily Improve the Effectiveness of the Portfolio Management Process 3. Conversion of the ETF Share Class to and from Specialized Share Classes which, among other features, provide low-cost investment management services to institutional investors and convenience to individual investors who want to pay their advisors in a tax efficient way.

4. Less frequent intra-day dissemination of a precise AMETF portfolio valuation proxy.

5. Improving AMETF investor returns by concentrating portfolio manager effort on controlled-size funds; capping the assets the manager will accept for specific fund strategies and providing for a higher management fee on capped funds that perform well.

6. Organization of the AMETF investment manager to concentrate portfolio management efforts on the management of fund portfolios to reduce leakage of investment information by restricting the investment manager's activities. Voluntary lagged portfolio disclosure may be made more frequently than required.

The Secondary Market Fund Share Trading System Feature of the Preferred Embodiment 7. A trading system for AMETFs and other exchange-traded fund shares and basket instruments that parallels the traditional method for purchase and sale of conventional mutual funds at Net Asset Value (NAV) without compromising the investor protection provided by the exchange-traded fund creation and redemption structure.

FIG. 1 shows a generalized fund share creation system 10 which allows for the creation of an actively managed exchange traded fund (AMETF) and a new type of indexed exchange traded fund (ETF). The overall system 10 includes the actions of a portfolio manager 12 that manages the fund. The currently available indexed exchange-traded funds are benchmarked to an index such as standard published benchmark indexes including the Standard & Poors 500, the Russell 2000 and a variety of other domestic and international equity and fixed income indexes calculated and maintained by an index provider 14. Changes are made to such indexes from time to time and the changes are published widely. Changes in the indexes used for the improved indexed ETFs covered by the present invention will be communicated to the portfolio manager 12 confidentially by the index provider 14 or developed internally by the portfolio manager 12. If the fund is actively managed, or if the index is developed internally, the portfolio manager will determine any portfolio changes inside the portfolio manager 12. The system 10 also includes authorized participants 16, securities markets 18, a fund 20, broker/dealers 22 and investors 24.

The portfolio composition changes initiated by either the portfolio manager 12 or the index provider 14 are entered into a portfolio composition management computer 30 which is coupled to a fund management computer 32. The index changes for the improved index fund are not published to the world until after the fund has had an opportunity to implement the index changes in the portfolio. The portfolio composition changes to any AMETF including the new indexed ETFs need not be revealed except as required by regulators. The fund portfolio composition management computer 30 manages the relative weighting of positions in the portfolio and the fund management computer 32 translates the desired composition into creation and redemption baskets and orders to buy and sell securities for the portfolio. The fund management computer system 32 is also designed to ensure compliance with the cut-off times for fund trading and to provide an audit trail for the creation and redemption of fund shares as explained below. Links to and from the systems for monitoring and implementing creation and redemption orders are not shown in FIG. 1. It should be noted that the computer systems 30 and 32 and other computer systems described herein may be different groups of networked computers spread out over different locations.

The portfolio manager 12 supervises the daily process of determining Portfolio Composition Files (PCFs) reflected in the fund's published creation and redemption baskets. These creation and redemption baskets are published each day in advance of the start of trading of shares in the fund. The authorized participants 16 have a series of trading and trading management computers 34 that allow the exchange of securities, fund shares, and cash between the authorized participants 16 and the securities markets 18, broker/dealers 22 and the fund and fund operations 20. The authorized participants 16 each have a back office computer system 36 that performs functions such as confirming trades, accounting and risk management. The broker/dealers 22 each have a trading computer system 38 that facilitates trading and record-keeping in a variety of ways such as performing position management, billing and ensuring compliance with market rules. All of the transactions described herein are completed electronically via network connections including proprietary networks and the Internet.

The authorized participants 16 may create shares in the fund by depositing a creation basket of securities (plus or minus a cash amount) in exchange for shares of the General Class of Fund Shares or redeem shares by depositing some of the General Class of Fund Shares in exchange for a redemption basket of securities (plus or minus a cash amount). The authorized participants 16 are broker-dealers and can include market makers and arbitrageurs. The market makers create and redeem shares to manage their inventories of fund shares whereas arbitrageurs hope to profit from small pricing differences between the price of the General Class of Fund Shares and the cost of creating or disposing of a creation or redemption basket. The authorized participants 16 have entered into agreements with industry transaction clearing organizations and agents of the fund whereby they agree to certain conditions in the creation or redemption of fund shares. The authorized participants 16 transact in the securities markets 18 to acquire the securities that typically make up part of the creation basket.

New shares of the General Class of Fund Shares of the fund 20 are created when an authorized participant 16 deposits one or more creation baskets which consist of securities designated by the portfolio manager 12 as a Portfolio Composition File (PCF) and a cash balancing amount which may be a payment to or a payment received from the fund. In return for a creation deposit, an authorized participant 16 receives newly created fund shares from the fund 20. A variety of internal and external computer systems allow the authorized participants 16 to deal in the secondary market for securities with other broker-dealers 22 or directly or indirectly with investors 24. The portfolio manager 12 uses the fund portfolio composition management computer 30 and the fund management computer system 32 to make appropriate changes to the creation basket reflecting desired changes in the basket of securities to be received in a creation. The portfolio manager 12 also distributes the creation and redemption baskets to the authorized participants 16, and a variety of Market data vendors (not shown). This information is typically distributed through the National Securities Clearing Corporation (NSCC), an industry utility which is a subsidiary of the Depository Trust and Clearing Corporation (DTCC). This industry utility also distributes an intra-day net asset value proxy to market participants through market data vendors. The fund management computer system 32 also handles a variety of accounting and operating functions including the generation of buy and sell orders for the fund's portfolio and generation of instructions for the fund's custodian and transfer agent functions, as subsystems linked to the computer 40 in operations of the fund 20. A similar process (not shown) is used to develop and disseminate the redemption basket and facilitate the fund share redemption process.

The trading and trade management computers 34 facilitate the exchange of securities (including securities represented in the creation and redemption baskets), fund shares and cash between the authorized participants 16 and the securities markets 18, other broker-dealers 22 and the fund 20. The fund management computer system 32, among other functions, initiates and confirms a variety of transactions, and maintains records and appropriate information for an audit trail of all orders entered with and by the fund. The various features of the preferred embodiment of the improved fund will now be described.

Early Cut-Off Times for Orders to Purchase and Redeem AMETF and ETF Shares

While the established ETF in-kind creation and redemption structure provides inherent protection from the grosser forms of mispricing and shareholder abuse uncovered in the mutual fund trading scandals, an active fund manager and an astute index fund manager need greater flexibility in managing the portfolio than is inherent in the exchange-traded index fund creation and redemption process as it is used today. Specifically, the necessary and appropriate publication of fully transparent creation and redemption baskets discourages effective implementation of portfolio composition changes by these index funds' managers if the notice of intent to create or redeem does not come early enough to permit the portfolio manager to adjust the portfolio for the effect of creation and redemption trades on the portfolio composition. In addition, the creation and redemption baskets for actively-managed ETFs may not reflect the manager's target fund portfolio as accurately as they typically reflect the composition of a benchmark index ETF. The manager of any exchange-traded fund needs the ability to trade between the time the fund receives notice of an incoming fund share creation deposit or an outgoing redemption basket and the time the net asset value is next calculated.

Thus the provisions of the preferred embodiment of the AMETF and ETF require early notice of orders to purchase or redeem shares in the funds. Early notice permits the portfolio manager to adjust the portfolio composition and incorporate the market impact of the entry or exit of shareholders on the prices used to calculate the fund's net asset value (NAV). The entering or leaving shareholders demand liquidity and—with early notice to permit portfolio composition changes—they pay for it indirectly. The portfolio manager's ability to adjust the composition of the fund portfolio after receiving notice of a creation or redemption of shares using previously posted creation and redemption baskets is essential to transferring the costs of entering and leaving the portfolio to the entering and leaving shareholders and relieving the ongoing shareholders of this burden.

In the preferred embodiment, a time between 2:30 p.m. and 3:30 p.m. is listed as the cutoff for purchase or redemption of baskets on Business Days when the market closing is 4:00 p.m. Eastern Time. This time is only an example of what might be an appropriate cutoff time for domestic equity portfolios. The cutoff time range is selected to be an early enough cut-off notice to permit the portfolio manager to adjust the portfolio to an appropriate portfolio composition by the time the market closes. In specific cases, as governed by the prospectus or subject to approval by the fund's board, the fund might set an earlier or a later cut-off time to provide the best possible service to entering and leaving shareholders without compromising the protection of ongoing shareholders. For funds other than domestic equity funds, different cut-off times will be required. In the case of international equity funds, for example, the appropriate early cut-off time for funds holding more than 3% of their assets in stocks traded on one or more primary markets outside the United States, could be 4:00 p.m. on any U.S. Business Day for pricing at the net asset value next determined for the fund after a full trading day in the primary markets for stocks accounting for 97% of the fund's equity portfolio. The 2:30 p.m. creation/redemption cut-off time for domestic equity funds and comparable rules for other types of portfolios solves one of the fund industry's greatest investor protection problems.

The early order cut-off system is illustrated in a flow diagram in FIG. 2A. In the preferred embodiment, the fund shares are exchanged for baskets of securities and cash. The notice by an authorized participant 16 of its commitment to create or redeem fund shares before the posted cut-off time is communicated to the communications computer module 52, which in turn confirms the receipt of a notification to the authorized participant 16 and simultaneously transmits a time-stamped report to a fund compliance officer 54, an agent 56 designated by the primary regulator or by the fund board and the portfolio manager 58. The portfolio manager 58 initiates any necessary portfolio modification transactions. The reports to the fund compliance officer 54 and to the agent 56 designated by the regulator or the fund board insure a record in a form which fund personnel will not be able to tamper with to conceal late entry of creation or redemption orders, thus providing protection from the late-arriving orders that have been a problem for conventional mutual fund shareholders.

Figure 2B:
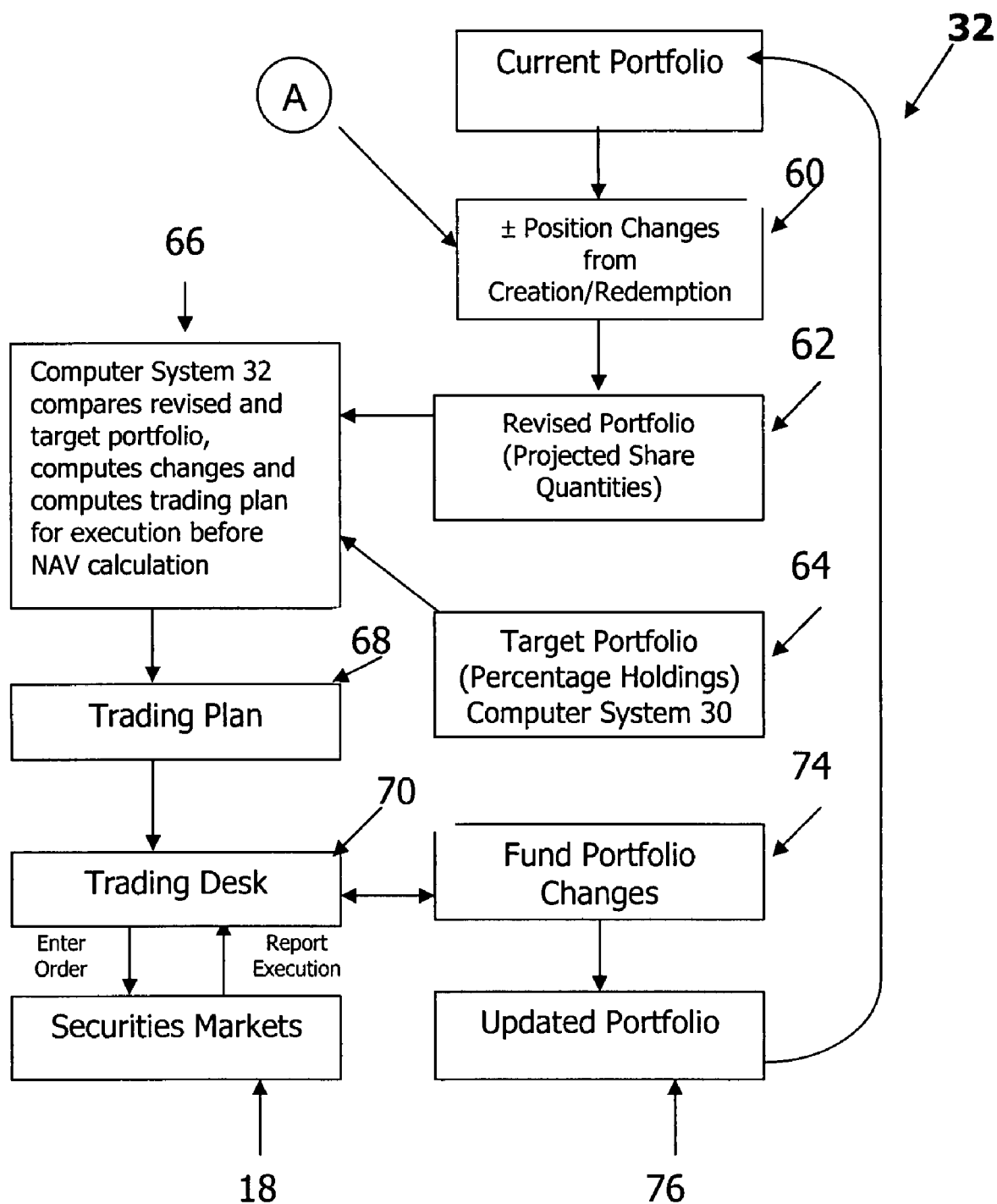
FIG. 2B is a flow diagram reflecting the portfolio and fund management process the portfolio manager uses to respond to early notice of a creation or redemption.

The portfolio management response to a creation or redemption order is shown in FIG. 2B. The notice of creation or redemption carries with it information about absolute and relative position changes that result from a creation or redemption. The portfolio position changes that result from the creation or redemption transaction(s) are broken out by the fund management computer 32 and appear in block 60 of FIG. 2B. The revised portfolio 62 is determined by the fund management computer 32 and a target portfolio 64 is created and maintained by the fund portfolio composition management computer 30. The target portfolio 64 reflects the percentage of holdings in each portfolio position developed by the fund portfolio composition management computer 30 and represents what the fund management computer 32 has determined is the appropriate portfolio the fund should hold at the end of the day. The fund management computer 32 compares the revised portfolio 62 to the target portfolio 64 and generates appropriate orders to buy and sell portfolio securities, developing a trading plan 68 for execution by the trading desk 70, preferably by the time of the NAV calculation. The trading plans are entered by a trading desk 70 (which is controlled by the fund management computer 32) into the transaction process in appropriate securities markets 18. Executions are reported as fund portfolio changes 74 and the updated portfolio 76, determined as of the close of the day's trading, becomes the then-current portfolio that is represented at the beginning of the process for the next trading day. Under this component of the preferred embodiment, an active portfolio manager and the manager of an improved index fund are given necessary and appropriate flexibility in managing the portfolio. The publication of totally transparent creation and redemption baskets which reflect the full fund portfolio composition discourages effective confidential implementation of portfolio composition changes by index fund managers. In AMETFs, including the improved ETF index funds, the creation and redemption baskets may not accurately reflect the portfolio manager's target fund portfolio. To protect ongoing shareholders, the manager of any exchange-traded fund, whether actively managed or based on an index, needs the ability to trade between the time the fund receives notice of an incoming fund share creation deposit or an outgoing fund share redemption basket and the time the net asset value is next calculated so that any transaction costs will be reflected in the prices used in the net asset value (NAV) calculations for the fund shares and the creation and redemption baskets.

Early notice permits the portfolio manager to adjust the portfolio composition and incorporate the market impact of the entry or exit of shareholders on the prices used to calculate the fund's NAV. The entering or leaving shareholders are demanding liquidity and they are indirectly paying for it. The portfolio manager's ability to change the composition of the fund portfolio after receiving notice of creation or redemption of fund shares using previously posted creation and redemption baskets is essential to transferring the costs of entering and leaving the portfolio to the entering and leaving shareholders and relieving the ongoing shareholders of this burden.

Entry and Exit of Investors Through an ETF Share Class or an Equivalent Process to Protect Ongoing Shareholders from the Cost of Providing Liquidity to Fund Share Traders.

Fully effective implementation of the improved fund requires that all entry of assets to and removal of assets from the fund is made through the generalized exchange-traded fund share creation and redemption process described above or a procedure providing equivalent protection for ongoing shareholders. This process protects ongoing fund shareholders from the costs of providing liquidity to entering and leaving shareholders. The late trading and market timing abuses uncovered at many mutual funds since September 2003 would not have been possible if the in-kind creation and redemption process, standard in exchange-traded funds, had been in effect for conventional mutual funds. The general requirement for in-kind creation and redemption not only protects fund shareholders from the cost of providing liquidity to traders by creating a clear audit trail for the order entry process, redemption in-kind (or partly in cash at the option of the fund) offers substantial advantages for taxable shareholders through deferral of capital gains realizations until a shareholder decides to sell fund shares.

Conversion of the ETF Share Class, Upon Shareholder Demand, to Specialized Share Classes A variety of Specialized Share Classes will be available for conversion from and back to the ETF Share Class used for fund shareholder entry and exit. These Specialized Share Classes provide custom management fee and marketing fee arrangements to accommodate different types of shareholders with investment objectives that coincide with the objective pursued by the fund. Among other features, these Specialized Share Classes are structured so that investors pay marketing and management fees in a tax-efficient manner and receive appropriate management fee discounts if they are large investors.

Under the U.S. tax code, separately billed fees paid by individuals for investment management services and various other services provided by financial intermediaries are not fully deductible against ordinary income taxes. For individuals subject to the Alternative Minimum Tax, separately billed fees may not be deductible at all. To preserve as much deductibility as possible, the most tax-efficient way for individuals to pay marketing and management fees is to pay them as management or service fees deducted from the investment income produced by funds in which they own shares. Separately billed marketing fees would similarly not be fully, or perhaps even partly, deductible and thus are often paid more tax efficiently when they are embedded in the cost of the fund and deducted from the income distributed by the fund.

Large institutional investors have more negotiating power than individual investors and traditionally pay lower investment management fees. However, in order to manage portfolios effectively and economically, it is best to bring all types of investors into a single pool rather than manage institutional portfolios separately from individual mutual fund portfolios. Such portfolio consolidation is another part of the purpose behind the use of Specialized Share Classes as explained below. Certain share classes would be available only to investors who were able to invest several million dollars or more in a particular fund. The structure of the share class relationships is shown in FIG. 3 and the computer system for share class conversion is illustrated in FIG. 4.

Figure 3:
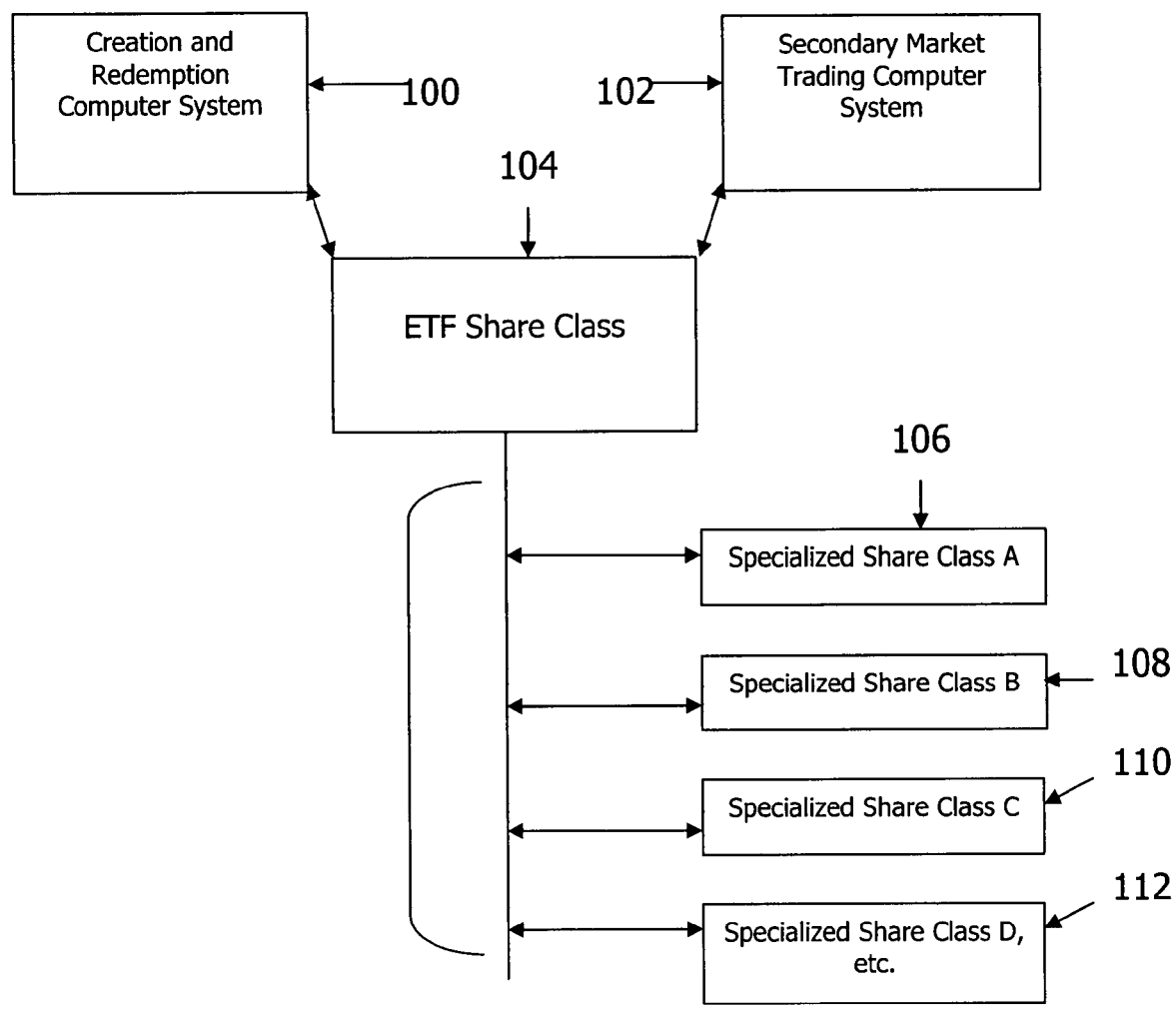
FIG. 3 is a block diagram of the relationship of all share classes.

The share class relationships illustrated in FIG. 3 show an ETF Share Class creation and redemption system 100 similar to the creation side of the system illustrated in FIG. 1, and a secondary market trading computer system 102 which includes functions reflected in the securities markets 18, the trading system 34 of the authorized participants 16 and the trading computer systems 38 of the broker/dealers 22 in FIG. 1. Creation and redemption (entry and exit of assets to and from the fund) involves an ETF Share Class 104. Although the Specialized Share Classes might be traded in a secondary market under some circumstances, the only share class that is ordinarily directly creatable or redeemable in a transaction with the fund is the ETF Share Class. Other share classes might include, as examples, Specialized Share Class A, a front end load share class 106; Specialized Share Class B, a back end load share class 108; Specialized Share Class C, a level load share class 110; and Specialized Share Class P, an institutional share class with a reduced expense ratio 112, for the convenience of various shareholders. Some users of these shares might want to facilitate the payment of a marketing fee to an individual or organization that provides sales and marketing services or advice. Other Specialized Share Classes would provide a variety of embedded marketing and management fees. The share classes A-D are intended to be illustrative, not exhaustive.

Figure 4:
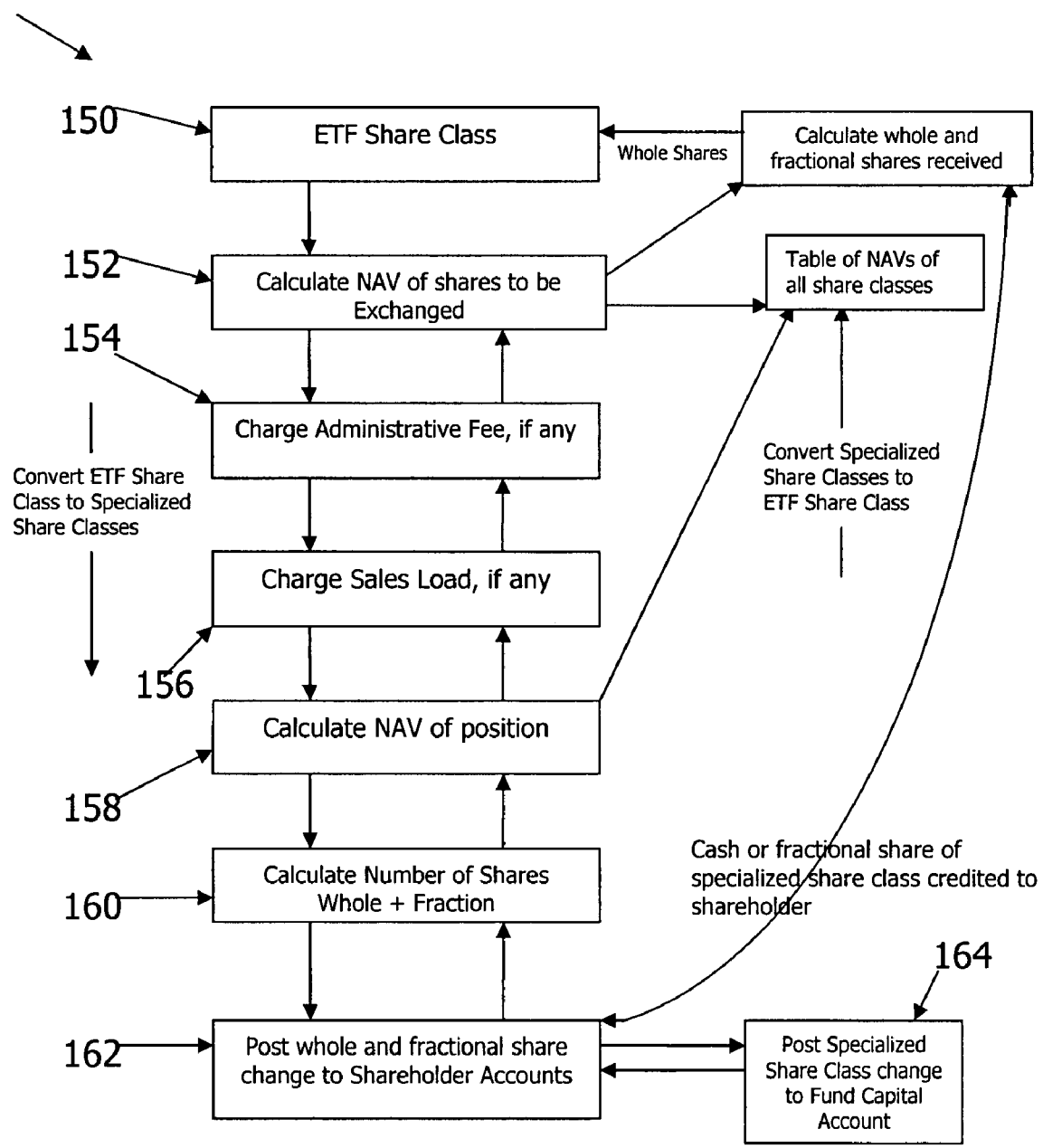
FIG. 4 is a flow diagram of the computerized system for conversion of the General Class of Fund Shares or ETF Share Class to and from Specialized Share Classes.

The share class conversions and exchanges in FIG. 4 are effected through the fund operation computer system 40 in FIG. 1. In FIG. 4, the process first identifies the ETF Share Class in step 150. The net asset value (NAV) of the shares to be exchanged is calculated in step 152. An administrative fee, if any is charged, is charged in step 154. A sales load, if any, associated with the particular Specialized Share Class is charged in step 156. For example, if the share is a share of Specialized Share Class A (with a front end load), the percentage charged for the front end load reduces the total value of the ETF Share Class shares entering into the calculation. The remaining value will determine the NAV available to be converted into Specialized Share Class A shares in step 158. The number of whole and fractional shares for the designated share class is then calculated in step 160. The whole and fractional share amount in the particular share class is posted to the fund's shareholder accounts in step 162. Changes in the Specialized Share Class are posted to the fund's capital account in step 164. Fractional shares will be available for all Specialized Share Classes. A Specialized Share Class may be created as the equivalent of the General Class of Fund Shares or ETF Share Class for fractional share positions under certain circumstances. When and if industry trading, clearing, transfer and custody systems are modified to accommodate fractional shares of fully DTCC-eligible securities, fractional shares of the ETF Share Class may be available. The process in steps 152 to 164 may be reversed to convert Specialized Share Classes back to the ETF Share Class. A table of NAVs of each share class is compiled daily by taking information from step 152 and step 158 and updating these NAVs for changes in the value of the underlying portfolio each day. These calculations are necessary because when a sales load or a different management fee is charged to a particular share class, the NAV of that share class will change in different ways than the ETF Share Class NAV changes, and subsequent transfers to and from that share class must be at values consistent with charges to investors using that class. ETF share equivalents (which may be needed in conjunction with the implementation of a cap on the issuance of new fund shares) are calculated using the ratios of the Specialized Share Class NAVs to the ETF Share Class NAV and adding all the ETF share equivalents of the outstanding shares.

Table 1 below shows the relationship of various alternative share classes to the ETF Share Class based on the ratio of their respective share classes' NAVs to the ETF Share Class NAV.

TABLE 1

| | Number of Shares Outstanding in Class | ETF Share-Equivalents Outstanding |
|---|---|---|
| ETF Share Class | $X_{ETF}$ | $X_{ETF}$ |
| Specialized Share Class A | $X_A$ | $aX_A$ |
| Specialized Share Class B | $X_B$ | $bX_B$ |
| Specialized Share Class C | $X_C$ | $cX_C$ |
| Specialized Share Class D, etc. | $X_D$ | $dX_D$ |
| Sum of ETF Share Equivalents = | | Y |

In Table 1, a, b, c and d are equal to the ratio of their respective share class's NAV to the ETF Share Class NAV. The sum of the various share class ETF Share Class equivalent net asset values in total (Y) is compared to the fund share cap stated in a fund's prospectus or adopted by the fund board. If Y plus the ETF Share Class equivalents in a standard Creation Unit exceeds the designated cap, no creations will be permitted until a redemption occurs or the cap is increased under the terms of the fund prospectus.

Less Frequent Intra-Day Dissemination of a Precise AMETF Portfolio Valuation Proxy Another feature of the improved fund is an increase in the interval between "precise" intra-day fund share net asset value (NAV) proxies calculated and distributed by NSCC, an industry utility, through electronic quotation vendors during the trading day. The net asset value proxy is based on the contemporaneous bids and offers for each security in the portfolio translated into a per-ETF Share Class share value expressed as a bid and offer or as the midpoint between the bid and the offer. The time interval between publication of these precise net asset value proxies would be greater than the 15-second interval common with today's index ETFs, say, between 5 minutes and 60 minutes in the preferred implementation, and may vary within that range at the discretion of the fund's board of directors, subject to regulatory approval.

The reason for reducing the frequency of net asset value proxy dissemination is that dissemination every 15 seconds provides a total of more than 1500 fund share values during the standard trading day. Given that AMETFs will usually have fewer positions than a broad market index exchange-traded fund, every 15-second dissemination provides a great deal of information and would permit an astute analyst to back calculate the composition of the portfolio and learn inappropriate details about the fund's ongoing trading activities. The appropriate interval for precise NAV proxy dissemination will vary for different funds depending in part upon the number and nature of the securities in the portfolio. However, the appropriate time interval for publication of precise indicative values does not bear a rigid relationship to the number of securities in the portfolio or any measure of portfolio turnover. The fund directors would determine the interval between precise portfolio valuation proxies subject to regulatory approval. Reducing the amount of information on the content of the portfolio provided to the marketplace will protect the fund shareholders from front-running of transactions the fund portfolio manager is making to modify the fund portfolio.

The fund management computer system 32 in FIG. 1 supplies data to a secure market data server (not shown) that continuously updates the net asset value proxy of the fund shares as bids and offers for the portfolio securities change throughout the day. Net asset value proxies are published at an interval approved for each fund by the fund board. The current standard interval for indexed ETFs is every 15 seconds. If an approximate indicative value is required at 15-second intervals for the use of investors and market makers, a randomized process will meet this need while reducing the portfolio information content of net asset value proxy calculations disseminated between precise calculations. Specifically, the values between periodic releases of precise values based on the actual portfolio could be based on the 15-second interval precise portfolio values incremented or decremented by a number drawn at random from a disclosed probability distribution. The random increments and decrements in these values will eliminate the opportunity to use the net asset value proxy publication to determine portfolio composition, yet avoid an indicative price too far away from the actual portfolio value to be useful to market participants.

Improving AMETF Investor Returns by Concentrating Portfolio Manager Effort on Controlled-Size Funds; Capping the Assets the Manager Will Accept for Specific Fund Strategies and Providing for a Higher Fee on Capped Funds that Perform Well In the preferred embodiment, after the AMETF complex reaches a size specified in its fund prospectuses, the investment process used by the management company would be used almost exclusively for products using the fund structure and process. A common set of directors will typically be directors of every fund managed using the fund family's common investment process and the directors will be responsible for ensuring that the investment process has adequate capacity to serve additional funds with different objectives without a detrimental effect on existing funds before the addition of funds not listed in the original documentation. In the preferred embodiment, the funds' prospectuses do not permit the fund manager to manage separate accounts or institutional pooled accounts except as share classes converted from ETF Share Classes. Rather than manage investment products that present a conflict of interest for the ETF Share Classes and the Specialized Share Classes converted from them, the investment manager might sell any excess research or idea capacity along a particular dimension to another investment manger on terms to be approved by the fund's directors. The manager could also have the opportunity to earn a higher fee on a capped portfolio.

Figure 5:
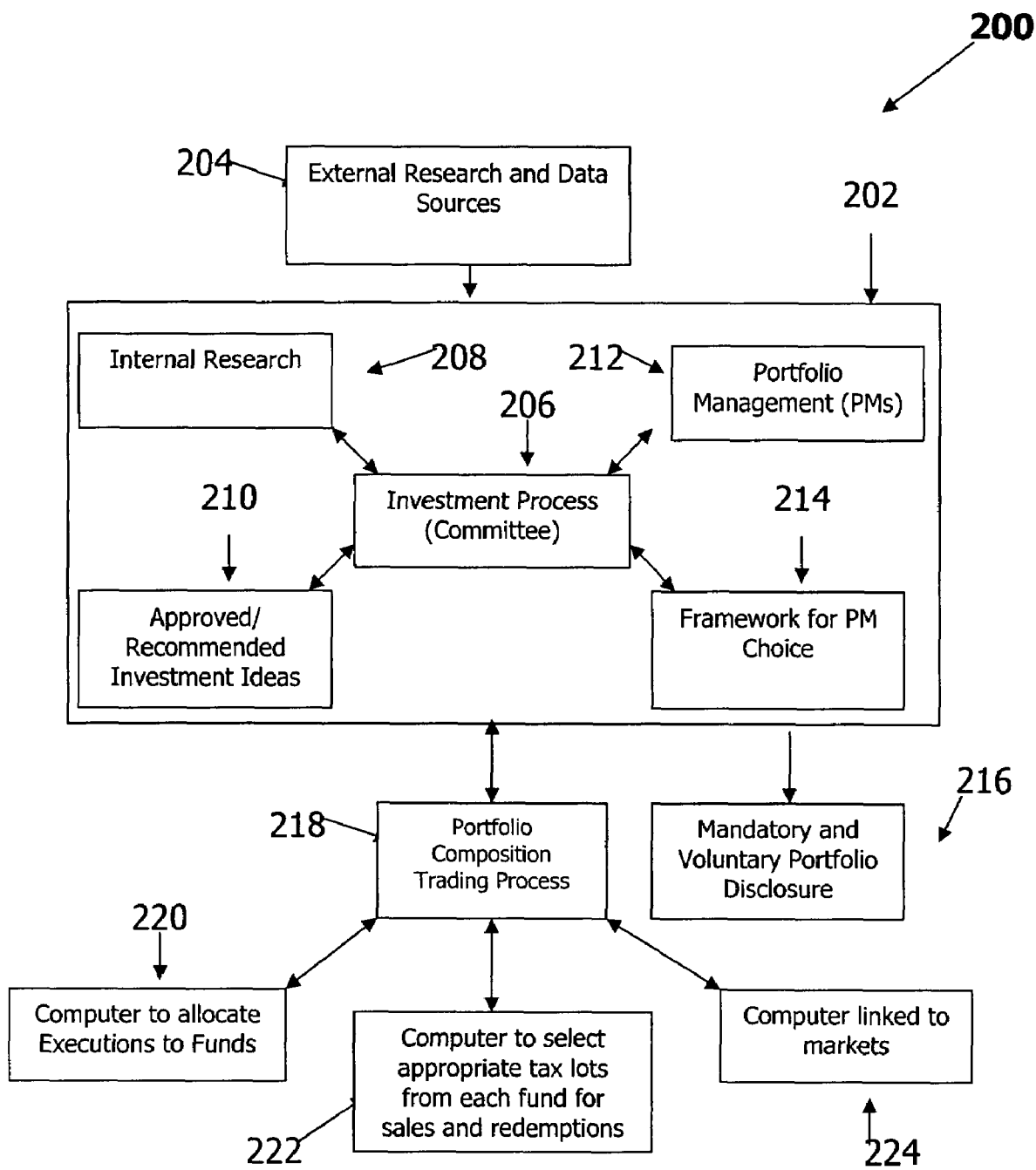
FIG. 5 is a block diagram of the portfolio management and trading system dedicated to the management of a family of AMETFs and other funds.

FIG. 5 illustrates the structure of such an AMETF dedicated portfolio management and trading system 200 which is part of the systems maintained by the portfolio manager 12 in FIG. 1. The portfolio management and trading system 200 is based on an investment process 206 incorporated in an investment management process 202 that also includes input from external research and data sources 204, internal research 208 and portfolio managers (PMs) 212 who are the essential and principal members of the investment process committee. The investment process committee 206 produces approved and recommended investment ideas 210 and a framework for portfolio management choices 214 to be used in the management of the organization's AMETF products. The investment management process 202 prepares the periodic mandatory and any voluntary fund portfolio disclosures 216. Voluntary disclosures could be made available with greater frequency than regulators require with the approval of the fund board. The investment management process 202 delivers instructions for changes to each fund through a portfolio composition trading process 218 that manages portfolio composition trading using the fund portfolio composition management computer system 30. The portfolio composition trading process 218 is indirectly involved in the allocation of executions to the various funds 220 using the fund management computer system 32 in FIG. 1. A tax management computer 222 stores tax data and selects appropriate tax lots of securities from each fund portfolio for delivery against sales and redemptions. A trading desk computer 224 links to various markets where trades are executed to complete the portfolio composition trading framework.

In the preferred implementation, the size of certain funds will be capped by provisions in the fund's prospectus or by a fund board resolution. The principal purpose of capping the size of some funds is to improve the probability that the funds will enjoy superior long-term performance for the benefit of their shareholders. In addition to or as a substitute for a fixed cap set by the prospectus, the fund could rely on fund board resolutions or use a computer system and database to compute the optimal size of a fund to determine the fund asset level at which a cap should be imposed by the fund board.

Figure 6:
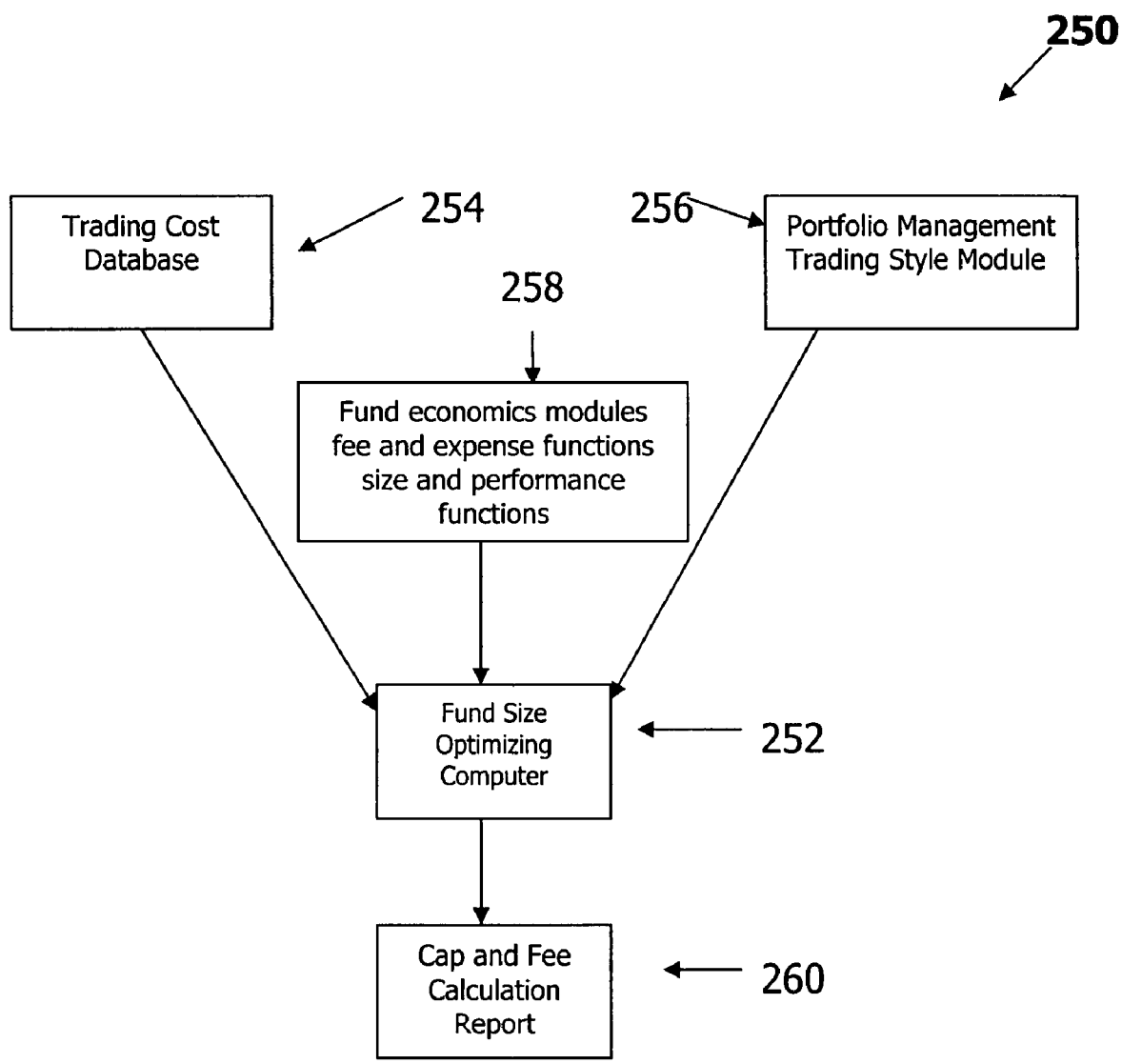
FIG. 6 is a block diagram which illustrates a computer system and databases used to estimate the optimum size of a fund for a cap calculation which may be used instead of embedding a fixed cap on the number of shares outstanding in a fund prospectus.

FIG. 6 is a block diagram of a computer system 250 designed to cap the size of a fund. It includes a fund size optimizing computer 252 coupled to a trading cost database 254 which includes, among other features, databases that link trading costs to the size of the positions which the family of funds as a group hold in individual securities with varying capitalizations and levels of trading activity. A separate trading style module 256 will contain information on the various fund trading styles and the trading cost experiences of the fund's portfolio managers and traders under different market conditions. A cost module 258 contains fee and expense functions for different fund sizes and performance functions based on industry experience and the experience of the managers employed by the funds. In addition, the cost module 258 has functions relating to the interaction between the fee structure and methods the funds are permitted to use to require re-conversion of low management fee Specialized Share Classes to the ETF Share Class and an algorithm for changing the management fee on the exchange-traded share class in response to performance achieved by the fund's portfolio management process. The fund size optimizing computer 252 produces an appropriate cap and fee calculation report 260 for recommendation to the fund board.

The purpose of capping some funds is to create an environment which eliminates the traditional conflict between the interests of investors and the interests of investment managers which usually leads managers to accumulate large pools of assets that make superior investment performance difficult or impossible.

With the exception of some funds holding predominantly large capitalization stocks, the investment manager will state in the fund prospectus or the fund board will determine the maximum number of ETF equivalent shares that each fund in a family will issue. The manager may also use a controlled share-growth formula to prevent growth that will swamp the manager's ability to achieve superior performance for the fund. The cap could be increased or the formula modified at a future date if the manager was comfortable with its ability to manage a larger portfolio and if the fund board or shareholders approved a change.

One purpose of the computer system 250 in FIG. 6 is to provide fee incentives for the fund manager to manage a smaller pool of assets more intensely and more effectively, providing better performance for investors and equal or better compensation for the fund managers without increasing the size of the fund portfolios to the extent that superior performance is no longer possible.

The prospectus of a capped fund will state the maximum number of ETF equivalent shares that the fund will issue or will otherwise describe the process for limiting the size of the fund. The Specialized Share Classes may have share prices different from the per share price of the ETF Share Class. The ETF share equivalent of a share in a Specialized Share Class will be equal to its net asset value (NAV) divided by the NAV of the ETF shares. If the maximum total ETF share equivalent issuance for a fund is reached, no more shares will be issued unless shares are first redeemed or the maximum issuance is increased. In the preferred embodiment, an authorized participant that redeems shares to reduce its inventory of shares in a fund that has reached its maximum size will have the exclusive right to re-create those shares at net asset value (NAV) plus a standard creation fee for a period stated in the fund prospectus. If the redeeming authorized participant does not re-create within the stated period, the fund board could shrink the fund by lowering the cap.

Capping fund size in some portfolios can solve the problem of finding a superior active manager and having assets managed by that manager over a long period of time. Capping should permit portfolio managers to post better performance records and, subject to the operation of a process to increase the management fee as a reward for good performance, earn more income. With fund management fee increases linked to multi-year performance and capped fund shares trading at a premium to net asset value (NAV), both investors and managers can earn as much or more than they might earn from larger portfolios using traditional fund and fee structures. The new fee structure will provide an incentive for performance more in line with the fund shareholders' interests than current fee structures.

Figure 7:
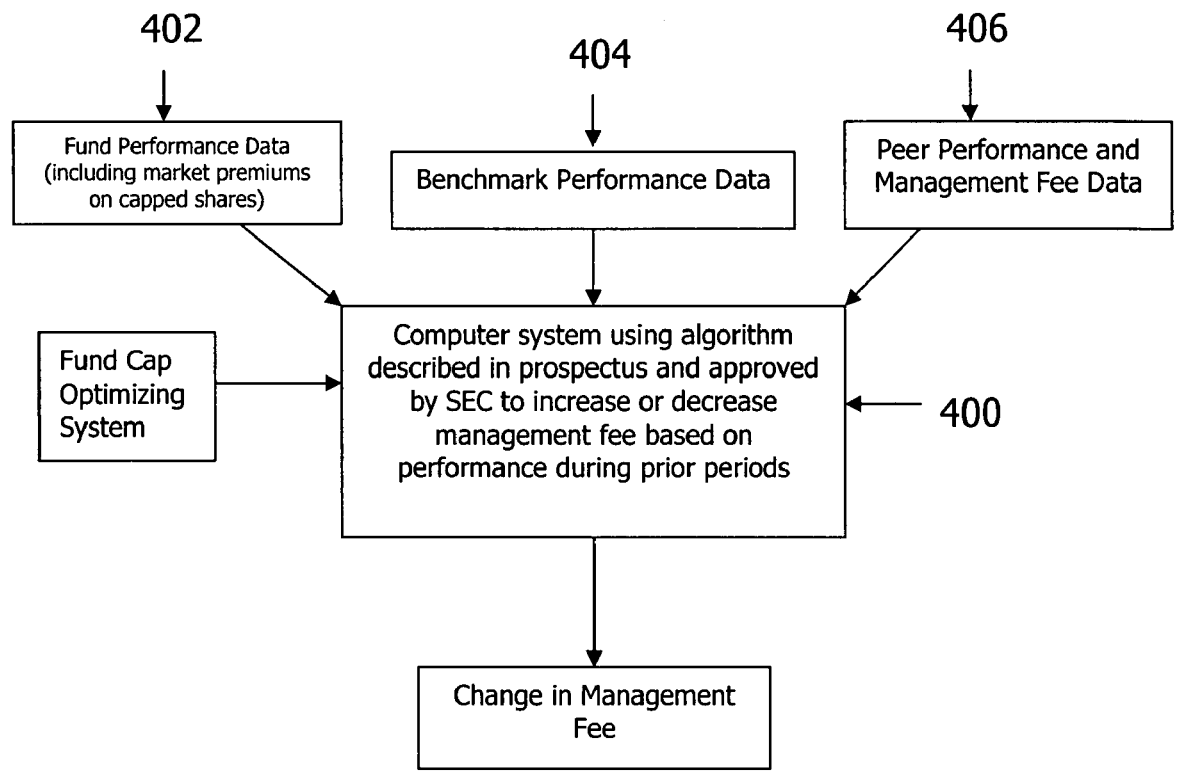
FIG. 7 is a block diagram illustrating a system for calculating changes in a fund management fee in response to changes in fund performance and other variables.

FIG. 7 shows a computer system 400 and associated data sources used to determine the management fee for a capped fund according to one aspect of the present invention. The computer system 400 includes a program based on an algorithm described in the fund prospectus and approved by the SEC that permits the fund board to increase or decrease the management fee based on fund performance during prior periods. The computer system 400 uses a fund performance data source 402, a benchmark performance data source 404 and a peer performance and management fee data source 406. The performance data will include traditional performance comparisons plus measures of average premiums over NAV that the ETF Share Class achieves. Such premiums may lead to an increased management fee in at least two ways. First, if the ETF Share class trades at an average premium over NAV that exceeds a level stated in the prospectus for a specified time, the holders of Specialized Share Classes with discounted management fees can be required to convert their shares to the full fee ETF Share Class. Second, if the premium persists at a designated level, the management fee can be increased to a multiple of the base rate. Appropriate terms to reduce fees if performance drops below a specified standard are part of the algorithm. The algorithm reflects the fact that the manager is giving up the ability to increase assets beyond the cap on the strength of a superior performance record. Thus, the potential for fee reduction is more limited than the potential for a fee increase in some circumstances. The computer system 400 outputs appropriate changes in the management fee for consideration by the fund board or automatic implementation under terms stated in the fund prospectus.

The creation and redemption rules are designed to encourage occasional redemptions after a fund reaches its cap in terms of number of ETF share equivalents. The existence of a cap without modest variability in the number of shares outstanding forecloses redemptions and leads to much greater share price volatility in the secondary market trading of the capped funds' shares than is necessary or desirable. The absence of redemptions could also reduce the tax efficiency of the fund. It is appropriate that a market maker with a temporary excess inventory of shares in a fund is able to redeem fund shares from time to time, bringing the size of the fund below the stated ceiling on the number of shares the fund would issue. This redemption permits the fund share market price to more closely reflect changes in the fund's net asset value and avoid significant fluctuations in any premium which the market price of the shares may carry over the fund's net asset value. Subsequent to such a redemption and for a period designated in the fund's prospectus, the redeeming authorized participant has the exclusive right to re-create the shares it had redeemed under terms established by the fund prior to its closing to new creations. These terms are essentially a re-creation of the shares redeemed with an in-kind deposit priced at net asset value plus a normal creation fee. If the redeemer does not re-create within the designated period, the fund has the option of either shrinking the cap on the number of shares it would issue (to shrink the fund because management has determined that the capped size was too large) or permitting any authorized participant to create shares up to the share ceiling under standard (NAV) terms for fund share creations.

This redemption and re-creation provision helps market makers with fund share inventory management. It moderates fluctuations in any premium on the fund shares' price in the secondary market once the ceiling on share issuance is reached. It also provides a mechanism whereby an occasional in-kind redemption can enhance the fund's tax efficiency. The expiration of the right to re-create also permits the fund board to reduce the fund's maximum capitalization if the fund's market space becomes less liquid or if the original ceiling on share issuance was not set low enough to protect the fund from being overwhelmed with assets. Any decision to shrink the market capitalization originates with the manager, with the fund board or with shareholders by petition.

Organization of the AMETF Investment Manager to Concentrate Portfolio Management Efforts on the Management of Funds to Reduce Leakage of Investment Information by Restricting the Investment Manager's Activities.

Another feature of the preferred implementation of the present invention preserves the value of the output of the investment process more directly. With a unified portfolio management and trading operation and limitations on product offerings, shareholders are well-protected from inappropriate dissemination of investment information. Specifically, the value of an investment idea is preserved until the funds managed by the organization have time to buy or sell as much as they want of a particular security.

One of the weaknesses of the typical active manager's investment management process—in which different types of accounts are buying or selling the same security—is information leakage. With a single pool for each fund and funds as the manager's only product, there are no conflicts associated with the order in which transactions are made, and there is no leakage to outside organizations from trade confirmations sent to owners of separate accounts and individuals associated with institutional and non-public pooled portfolios. Of all possible structures for the collective management of investment portfolios, pooling is accomplished most efficiently and most confidentially with multiple-share-class funds that control publication of their portfolios.

With the concurrence of a fund's directors, the investment manager may disclose a recent fund portfolio to the public at appropriate intervals by any means the appropriate regulatory authorities approve. These may include posting on a website or other electronic dissemination. The disclosure process permits free and equal access to the information by any investor with Internet access. When implied portfolio disclosure is made through changes in creation and redemption basket composition, these changes are appropriately disseminated through public postings. Formal portfolio disclosure can be no less frequent than the quarterly disclosure with a 60-day lag now required of conventional mutual funds. However, in many cases, fund managers will be encouraged by market forces to make more frequent portfolio disclosures to increase the efficiency of secondary market trading in the fund shares without harm to ongoing fund shareholders from such disclosures. The computer model disclosed in FIG. 5 monitors both portfolio construction and transaction plans and governs and implements any portfolio disclosures that take place at shorter intervals than the interval imposed by regulators.

Figure 8:
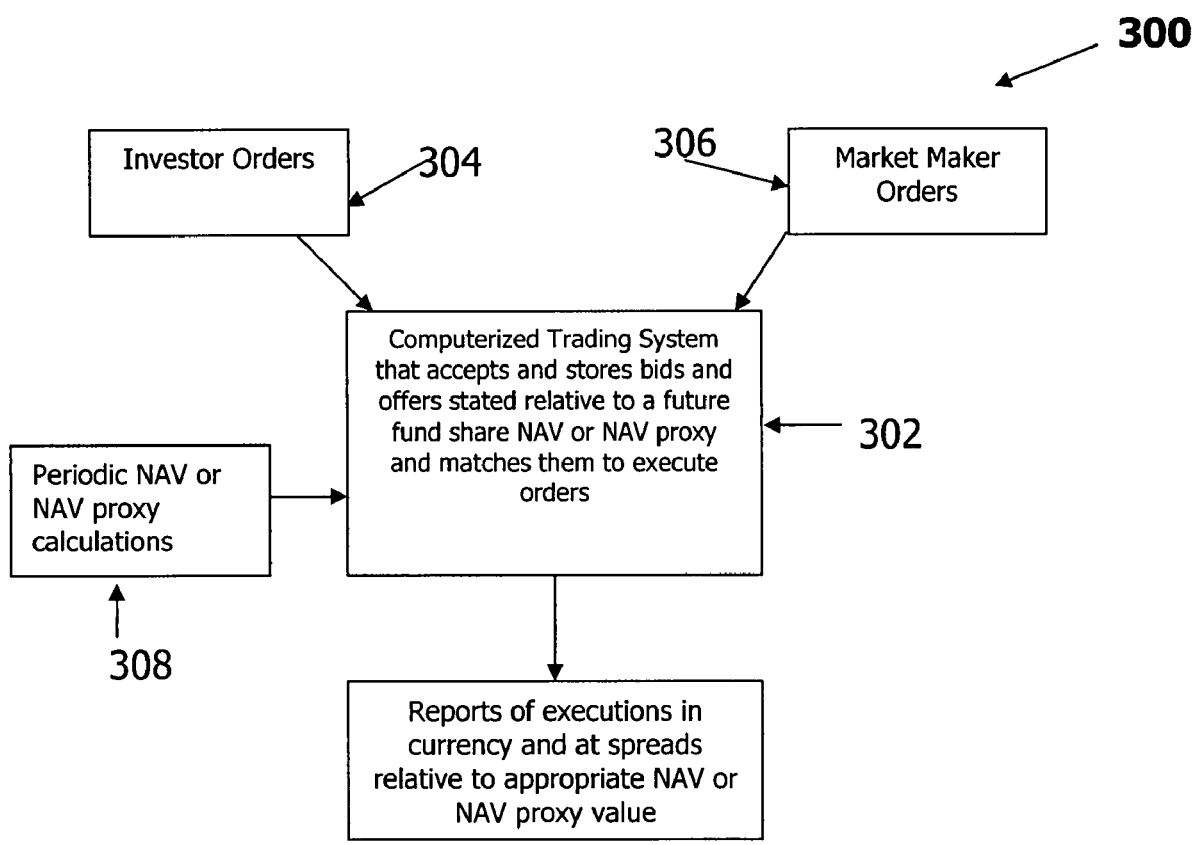
FIG. 8 is a block diagram of a computerized market for trading fund and other basket shares at prices linked to the future net asset value of the share classes.

A Trading System for ETFs and Other Basket Instruments that Parallels the Traditional Method for Purchase and Sale of Conventional Mutual Funds at Net Asset Value (NAV) without Compromising the Investor Protection Provided by the Exchange-Traded Fund Creation and Redemption Structure Licenses may be offered to appropriate trading venues to use computer systems designed to permit special intra-day auctions linked to periodic disclosure of the intra-day valuation proxy and the closing net asset value (NAV). These auctions will provide a trading mechanism intermediate in some respects between those of mutual funds and today's benchmark index ETFs. FIG. 8 shows a computerized market 300 allowing trading of ETF shares at prices linked to future NAV calculations which may be used as a pricing basis. The market 300 is centered around a computerized trading system 302. The computerized trading system 302 matches orders in terms of their statement of a bid or offer below, at or above the NAV or NAV proxy to be calculated on prevailing bids and offers for portfolio holdings and disclosed at a specified future time. The computerized trading system 302 accepts orders from investors 304 and market makers 306. The computerized trading system 302 receives periodic NAV calculations and NAV proxy calculations 308. The computerized trading system 302 produces reports of executions in currency and at spreads relative to the daily closing NAV or NAV proxy values posted at specified times. The trading system accommodates trading in any fund, trust or structured product for which a net asset value based on the prices of its holdings of securities or other financial instruments is periodically calculated.

The NAV-linked executions at stated times permit investors to place orders with market makers through traditional financial intermediaries for purchase and sale of shares at a price linked to an hourly posting of the intra-day net asset value proxy or at the official end-of-day net asset value. In some cases, these trades may be done at a spread and in others the market maker may provide a guarantee of a fill at net asset value with no spread or commission—the effective execution cost depending in part upon the time interval between the entry of the order by the investor or the investor's agent and the price calculation. Instead of making a market at a specific price, the market maker bids and offers at a spread below, at and above the next reported hourly intra-day proxy value or the closing NAV. The spread away from the designated NAV determination will generally widen as the time of price determination draws closer because the market maker has less time before the price determination to hedge or offset risk with another trade.

Using the closing NAV as the target in such a trading structure makes the pricing and trading of ETFs much like the conventional mutual fund trading process. Market makers may be willing to guarantee execution with no commission at the closing net asset value on orders received far enough in advance. Obviously, an order for execution at today's NAV with no commission is not acceptable to a market maker after a certain time. The cut-off time for such an order may vary among funds and among market makers.

While mutual fund transaction systems are designed to accommodate trades denominated in dollars with share positions expressed as whole and fractional shares, stock and ETF trading systems and, most significantly, clearing systems do not accommodate fractional shares. Some firms show fractional stock or ETF shares in a customer's account but such fractional share positions cannot be transferred electronically to other firms. The trading mechanism of the preferred embodiment converts part or all of a dollar-based transaction into a Specialized Share Class with the same per share NAV as the General Class of Fund Shares and the appropriate share position will appear in the customer's account as a conventional fund share class position. This feature adds to the similarity of this trading process to the traditional mutual fund transaction process.

Cost Savings to Investors and Investment Managers

The following table, Table 2, compares estimates of the costs experienced by a typical long-term investor in an actively-managed domestic equity mutual fund to the costs of an actively-managed domestic equity version of the new fund according to the present invention. The potential cost/performance difference is as much as 4.10% per year. The new structure offers substantial advantages to investors, largely from eliminating unnecessary or inappropriate costs and fund size-related performance penalties.

TABLE 2

|  | Equity Mutual Fund | New Equity Fund |
|---|---|---|
| Expense Ratio | 1.0% | 1.0% |
| Portfolio Composition Trades Inside the Fund | 1.5% | 1.5% |
| Fund Share Trading Liquidity Costs | 1.4% | |
| Leakage of Investment Info/Index Publication | 0.35% | |
| Fund Supermarket vs. Multi-Share Class ETF | 0.35% | |
| Performance Penalty from Oversized Funds, Net of Higher Performance Fee | Up to 2.00% | |
| Annual Total | 6.60% | 2.50% |

In Table 2, there are no recurring fund share trading liquidity costs for the new fund structure because any costs to enter and leave the ETF Share Class are paid by the trading shareholder only when entering or leaving the fund. The estimate of the cost of information leakage is based on an estimate of half the typical annual cost of the publication effect of S&P 500 composition changes. The fund supermarket costs are usually annual costs to all of a fund's shareholders in no transaction fee (NTF) shares, whether they use the fund supermarket or not. Some annual supermarket fees paid by funds are higher than 0.35%. There are no annual marketing fees in the new structure without a specific agreement by the investor to pay them in connection with ownership of a Specialized Share Class. The performance penalty associated with fund size is an estimate based on limited data from active fund managers and trading cost analysts.

It will be apparent to those skilled in the art that various modifications and variations can be made in the method and system of the present invention without departing from the spirit or scope of the present invention. Thus, the present invention is not limited by the foregoing descriptions but is intended to cover all modifications and variations that come within the scope of the spirit of the present invention and the claims that follow.

Example 2

Methods, Systems, and Computer-Program Products for Managing Multiple Investment Funds and Accounts Using a Common Investment Process Additional embodiments of the invention shall now be described.

Exemplary Systems and Methods for Funds and Separate Accounts

Figure 9:
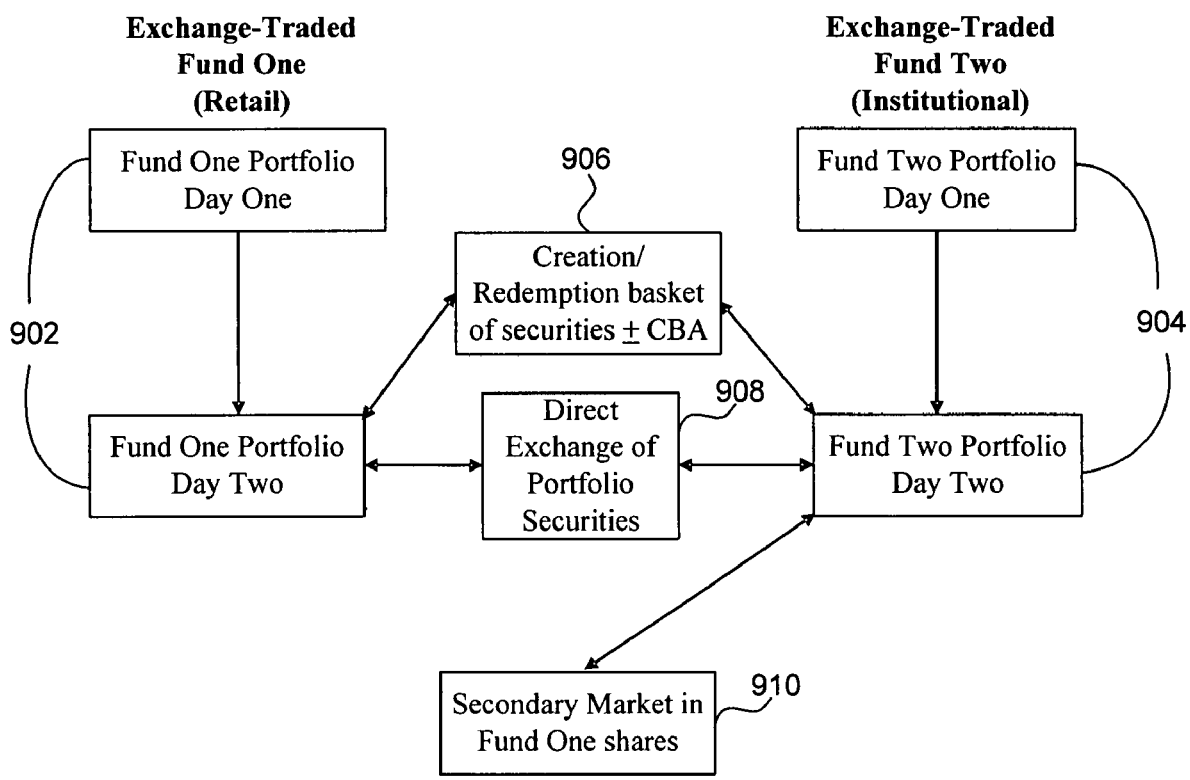
FIG. 9 illustrates an exemplary system for integrating multiple funds with similar investment processes in accordance with embodiments of the present invention.

FIG. 9 illustrates an exemplary system 900 for integrating multiple funds with similar investment processes in accordance with embodiments of the present invention. The exemplary system 900 may be incorporated within a number of embodiments of the invention that describe an interaction between two paired funds that use the same investment process. In preferred embodiments, the paired funds may be exchange-traded funds, such as exchange-traded fund 20 of FIG. 1, although additional embodiments may feature mutual fund, and closed-end funds, either alone or in combination. Further, although the embodiments of FIG. 9 are described in terms of two paired funds, additional embodiments may incorporate any number of funds that would be apparent to one skilled in the art.

In one embodiment, the paired funds may include a retail fund and an institutional fund, whose holdings are respectively characterized by a fund one portfolio 902 and a fund two portfolio 904. The fund one portfolio 902 is comparable in composition to the fund two portfolio 904 on a given day of the fund's operation, herein labeled "day one." On the next day of operation, herein labeled "day two," the fund one portfolio 902 and/or the fund two portfolio 904 may change in size and composition as the result of the deposit of a creation basket 906 or delivery of a redemption basket 906 of portfolio securities and transactions in the fund portfolios.

On any given day, the composition of the respective funds will be similar by the close of trading when net asset values are calculated and transactions in fund shares and portfolio exchanges are made. Some, but not all, of the possible transactions and exchanges described below are indicated within FIG. 9. Further, specific transactions and interactions useful in accommodating entry and exit of shareholders in fund two are described in detail within the embodiments of FIGS. 11 and 12.

Figure 11:
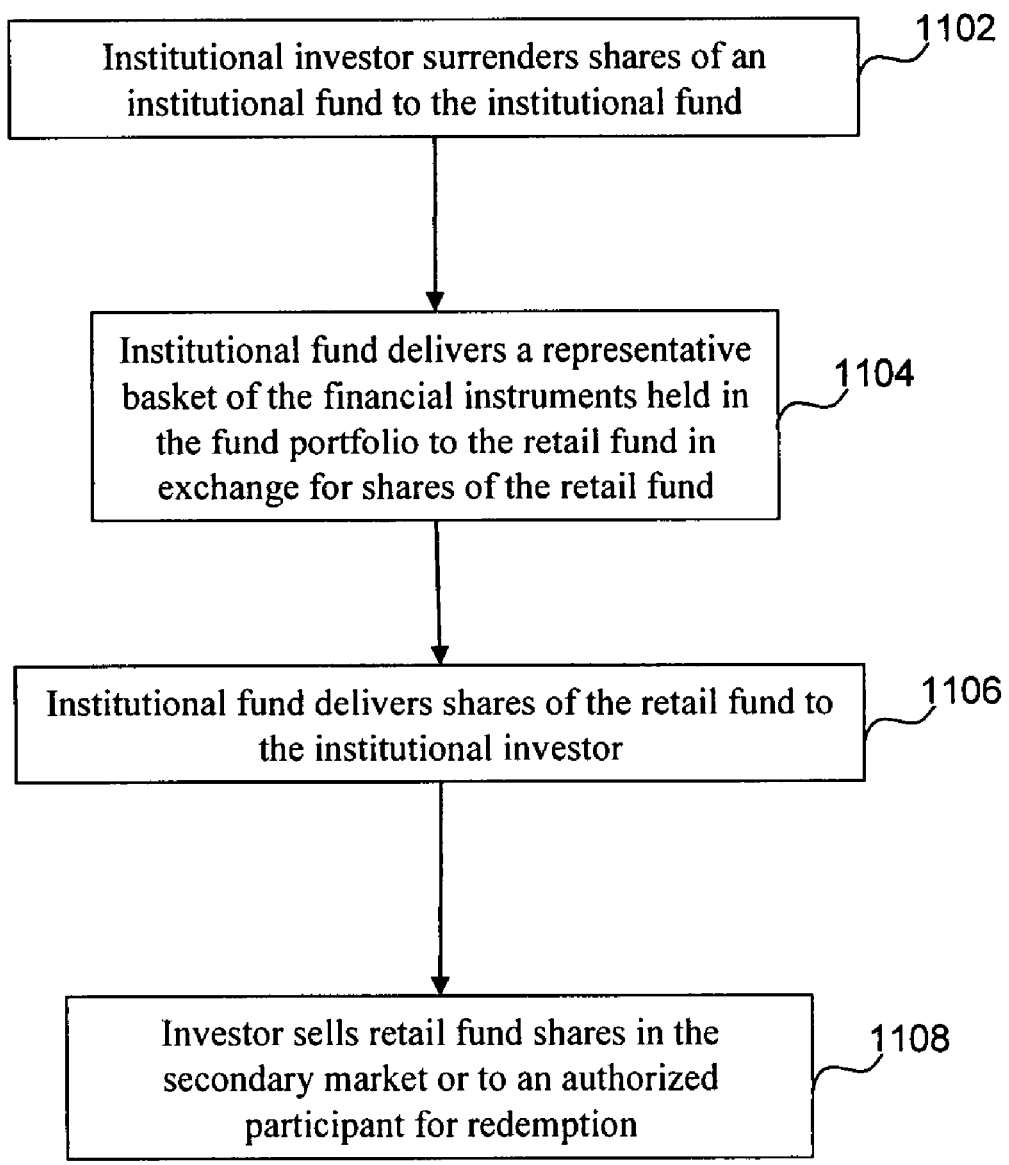
FIG. 11 illustrates an exemplary method for exiting a fund according to an embodiment of the present invention.

To the extent that an institutional holder or some other large investor eligible to have a position in fund two 904 chooses to take a new position or increase the size of a position in fund two 904, or when the number of shares an investor in fund two 904 wants to hold differs from the number of shares represented in the creation/redemption basket 906 of the fund, an authorized participant may create shares in fund one 902 for the investor, or the investor in fund two 904 may purchase shares of fund one 902 in the secondary market 910 and tender them to fund two 904 for conversion to shares of fund two 904 through a direct exchange of portfolio securities 908. Fund two 904, in addition to its own portfolio, may hold shares in fund one 902 to meet investor requirements that cannot be met with whole creation units. Fund two 904 may also use shares of fund one 902 to make redemption payments to its investors as illustrated by FIG. 11 and discussed below.

To the extent that the desired holdings of an investor in fund two 904 do not exactly match a whole number multiple of the standard creation basket, the investor in fund two 904 may purchase shares in fund one 902 and tender them to fund two 904 in exchange for shares of fund two 904. Indirectly, shareholders in fund two 904 may pay the retail management fee of fund one on any of fund two's holdings of fund one. Alternatively, the management fee of fund two may be reduced to reflect the higher fees collected on fund two's holdings in fund one. Fund two 904 may also deliver any number of shares of fund one that is acceptable to both funds to fund one in exchange for a basket of portfolio securities representative of the similar portfolios of the two funds.

A similar exchange to that described in the previous paragraph may accommodate the delivery of shares in fund one to shareholders of fund two to facilitate the withdrawal of assets from fund two. Such baskets of portfolio securities exchanged directly between the two funds may differ from the standard posted creation and redemption baskets of the funds because they reflect the actual fund portfolios. The portfolio securities baskets exchanged between the two funds match the similar portfolio compositions of the two funds very closely. However, unlike the published portfolio composition files (PCFs), these baskets of securities need not be a fixed size in terms of fund shares and their contents need not be made public at the time of the exchange to protect trading information and preserve the integrity of the investment process.

Table 3 briefly summarizes features of exemplary retail and institutional funds that may be incorporated within the exemplary system 900. Table 3 is provided solely for purposes of illustration, and not limitation. In Table 3, variables X, Y and Z represent different quantities or numbers that bear no specific functional relationship to each other. When variables are given as identical for the first and second funds, a magnitude of that variable would be roughly identical for both funds in embodiments presented herein. However, when the variable specified for the first fund differs from that of the second fund, a significant difference may exist between the magnitude of the variables in some applications of the product structure and process. A portion of the terminology used to describe the first fund and the second fund within Table 3 is specific to the ETF share creation and redemption process and has been outlined above with respect to FIG. 1.

TABLE 3

|  | First Fund (Retail) | Second Fund (Institutional) |
|---|---|---|
| Creation Unit Size | X fund shares | X fund shares |
| Minimum holding by shareholder | fractional or single fund share | Y fund shares |
| Minimum incremental share holding above minimum | fractional or single fund share | fractional or single fund share |
| Management fee | Retail (relatively high) | Lower than Retail on average with some assets at Retail fees under some circumstances |
| Creation/redemption fee for change in aggregate fund size through ETF creation/redemption process | $Z | $Z |
| Creation/redemption fee for portfolio securities exchanged between and among paired funds/portfolios | $0 or small administrative charge | $0 or small administrative charge |

The example of Table 3 indicates that a retail fund, such as first fund 1002, and an institutional fund, such as second fund 1004, both have a comparable creation unit size and a comparable minimum incremental share holding above a minimum holding. Further, the retail fund and the institutional fund charge comparable fees for changes in aggregate fund size through the ETF creation and redemption process and for exchanges of portfolio securities between and among paired funds and portfolios. Although not described within Table 3, the portfolios of securities held by the retail fund and the institutional fund using the same investment process would be comparable in composition.

Table 3 also indicates that a minimum holding requirement and a management fee respectively associated with the retail and institutional funds may differ significantly in magnitude. In particular, the retail fund may require an entering investor to purchase only a small number of shares, such as a fractional or single share, and the retail fund may charge its investors a relatively large management fee. In contrast, the institutional fund may require an entering investor to purchase a large block of shares, and the management fees charges to shareholders in the fund are on average lower than those charged by retail funds.

Figure 10:
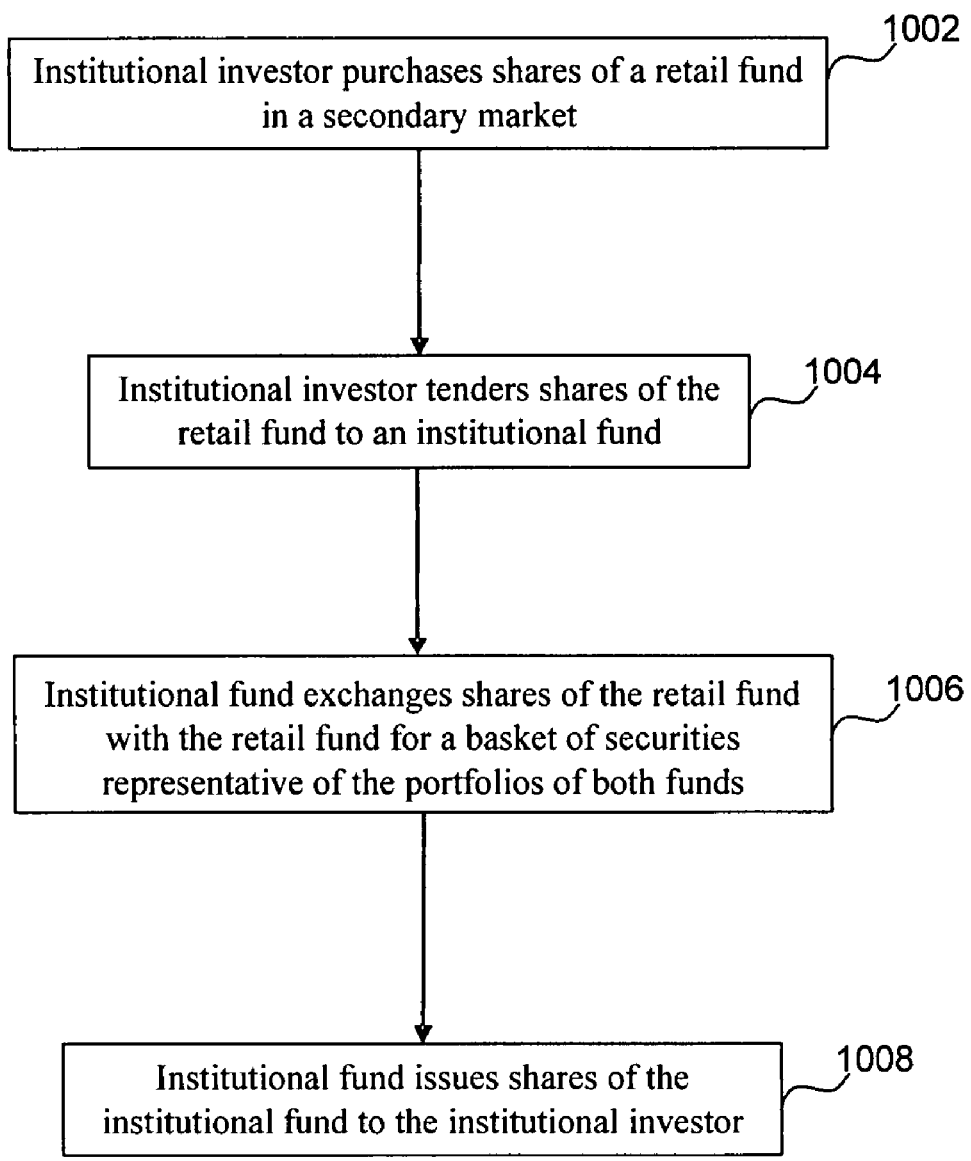
FIG. 10 illustrates an exemplary method for making an investment in a fund according to an embodiment of the present invention.

FIG. 10 illustrates an exemplary method 1000 for accommodating entry of investors into an institutional fund while providing full shareholder protection for the ongoing shareholders of that fund from the costs of shareholder entry. In step 1002, an institutional investor purchases shares of a retail fund in the secondary market for retail shares. In step 1004, the institutional investor tenders the retail fund shares to the institutional fund, whereupon the institutional fund exchanges the retail shares with fund one for a basket of securities representative of the common portfolio of the two funds in step 1006. The institutional fund then issues shares of the institution fund to the institutional investor in step 1008.

FIG. 11 illustrates an exemplary method 1100 for accommodating exit of investors from an institutional fund while providing full shareholder protection for the ongoing shareholders of that fund from the costs of shareholder exit. In step 1102, an institutional investor tenders shares of an institutional fund to the institutional fund in a size other than a creation unit, whereupon in step 1104, the institutional fund delivers a basket of securities representative of the common portfolios of the two funds to a retail fund in exchange for shares of the retail fund. The institutional fund then delivers shares of the retail fund to the institutional investor in step 1106, and the institutional investor sells shares of the retail fund on the secondary market for retail fund shares in step 1108. Alternatively, the investor may sell the shares of the retail fund to an authorized participant, such as authorized participant 36 of FIG. 1, for redemption.

The embodiments of FIGS. 9, 10, and 11 are described in terms of a single retail fund and a single institutional fund for purposes of explanation and clarity. In additional embodiments, the exemplary systems and methods may incorporate any number of additional retail or institutional funds that share a common investment strategy. Further, although explained in terms of exchange-traded funds, the retail and institutional funds may represent a combination of exchange-traded funds, closed-end funds, and mutual funds, either alone or in combination, that share a common investment process and that would be apparent to one skilled in the art.

Figure 12:
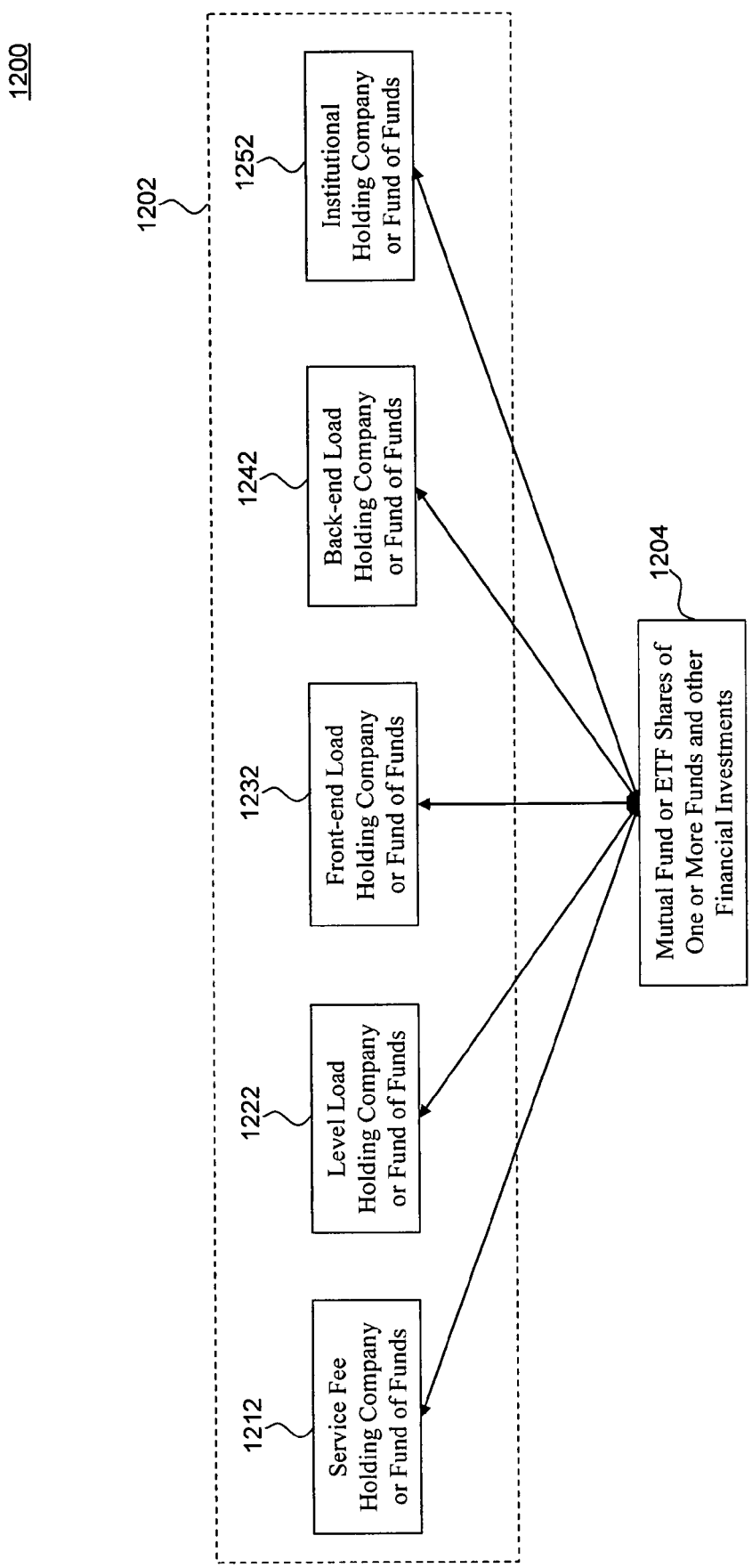
FIG. 12 illustrates an exemplary system for integrating multiple fund portfolios using specialized distribution funds according to an embodiment of the present invention.

FIG. 12 illustrates an exemplary system 1200 wherein the objective of integrating fund portfolios and distributing them efficiently and consistently with industry practice is achieved by use of specialized distribution funds with a holding company or fund of funds structure in accordance with an embodiment of the present invention. The holding company or fund of funds can be one of a number of fund types, including, but not limited to, open-end mutual funds and exchange-traded funds. Although not illustrated in FIG. 12, a similar result may be achieved with some types of pooled separate accounts used in variable annuities or variable life insurance contracts. Each fund included within the embodiment of FIG. 12 may have some or all of the characteristics of a mutual fund or an exchange-traded fund, including, in the case of the latter, a requirement for redemption in-kind.

The holding company or fund of funds structure 1202 implements distribution through one or more distribution channels. One such fund is illustrated in FIG. 12 by a service fee holding company or fund of funds 1212 which provides an administrative or marketing service payment typically designated as a service fee or as a 12(*b*)(1) fee paid to financial intermediaries that provide services such as shareholder accounting or limited advisory and administrative services to retail investors. Such financial intermediaries may include brokers, registered investment advisors, and sponsors or administrators of defined contribution retirement plans. Also shown are a level load holding company or fund of funds 1222 that makes periodic distribution fee payments to a financial intermediary instrumental in selling its shares; a front end load holding company or fund of funds 1232 that pays a front end load to a marketing organization; a back end load holding company or fund of funds 1242 which shares certain characteristics with the level load holding company or fund of funds 1222 and provides for a contingent deferred sales charge; and an institutional holding company or fund of funds 1252 through which the investment adviser of a fund held by the fund of funds or holding company pays, from time to time, a promotional fee to qualified institutional investors who own a required minimum number of shares or invest a required minimum dollar amount in the fund's shares.

The promotional fee paid to holders of the institutional holding company or fund of funds' 1252 shares reduces the effective cost of holding shares of this fund below the expense ratio of the underlying exchange-traded or mutual fund shares. The promotional fee enables the retail exchange-traded fund and the holding company or fund of funds prospectuses and marketing materials to publish the proportion or dollar value of the shares of the underlying fund(s) held by institutional investors as indicating endorsement of the advisor's investment process by large and presumably sophisticated investors. In alternate embodiments, this objective is may be achieved through a fee discount.

The holding companies or funds of funds illustrated in FIG. 12 acquire and dispose of positions in exchange-traded funds, other funds, and other securities held in their portfolios through transactions directly with the funds in the case of certain conventional mutual funds or creation unit size transactions with exchange-traded funds, or through transactions in the secondary market for traded securities including exchange-traded funds and other financial instruments. These purchases may be made at various prices throughout the trading day, or they may be made using a net asset value (NAV)-based trading system described herein.

In the embodiments of FIG. 12, the holding companies and funds of funds need not be affiliated with or under common control with the mutual funds, exchange-traded funds or issuers of other financial instruments held by the holding companies or funds of funds. In additional embodiments, two or more independent organizations can develop complementary structures and processes to implement the invention.

Figure 13:
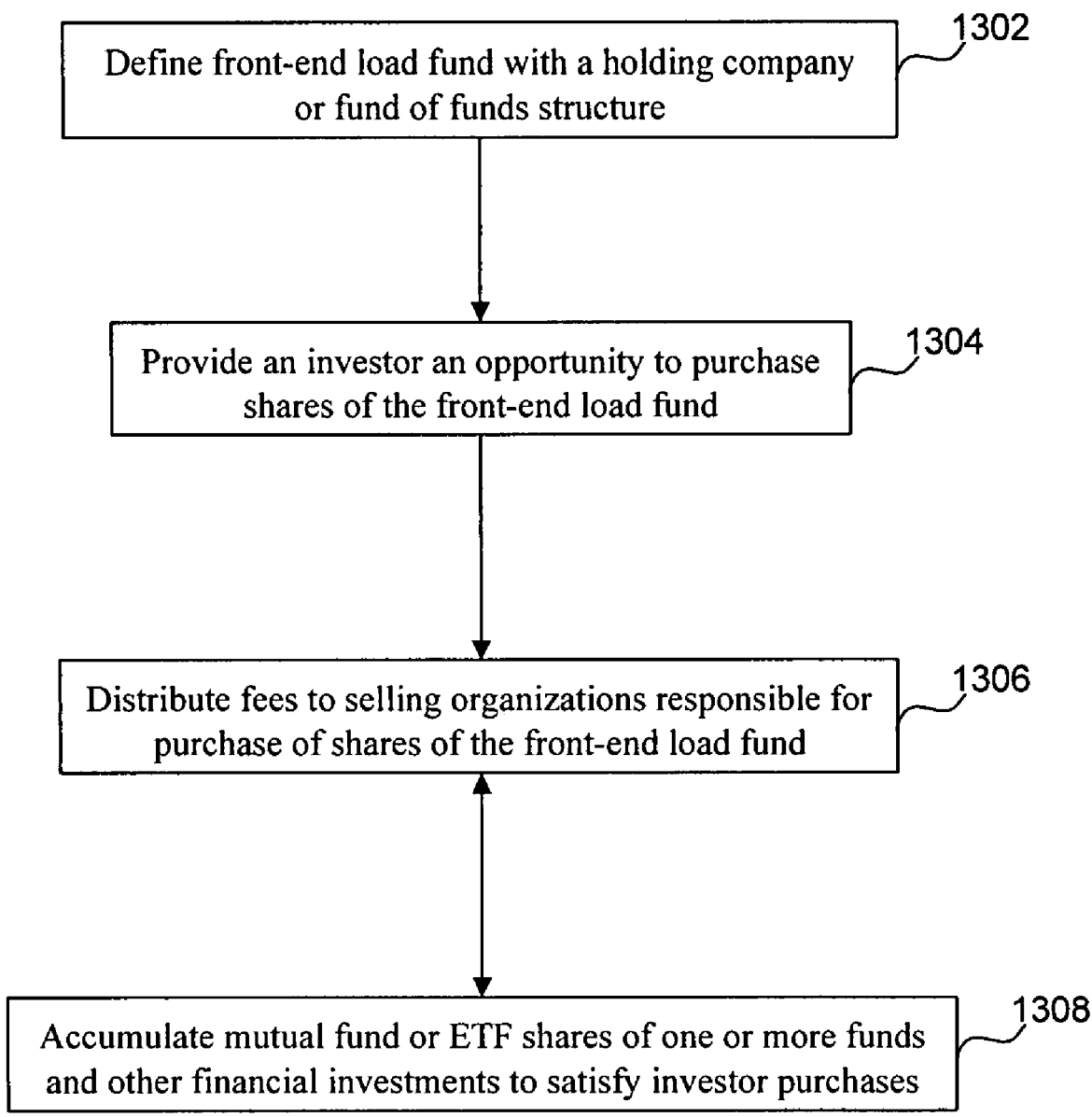
FIG. 13 illustrates an exemplary method for distributing exchange-traded funds using a front-end load holding company or fund of funds according to an embodiment of the invention.

FIG. 13 illustrates an exemplary method 1300 for integrating multiple fund portfolios using a front-end load fund according to an embodiment of the invention. In FIG. 13, a front-end load fund having a holding company or fund of funds structure is defined within step 1302. The defined front-end load holding company or fund of funds, such as front-end load holding company or fund of funds 1232 shown in FIG. 12, may embody characteristics of a mutual fund or an exchange-traded fund, including in the case of the latter, a requirement for redemption in-kind. The front-end load holding company or fund of funds may itself hold shares in any number of mutual funds and exchange-traded funds (ETFs). Further, the front-end load holding company or fund of funds may pay a front-end load to a marketing organization associated with the sale of shares in the holding company or fund of funds.

In step 1304, the holding company provides a pool of investors an opportunity to purchase shares of the front-end load holding company or fund of funds. Then, in step 1306, marketing fees paid by investors in the front-end load holding company or fund or funds may be distributed to selling organizations responsible for persuading investors to purchase shares of the front-end load holding company or funds of funds.

In step 1308, the holding company or funds of funds accumulates shares of specified mutual funds, ETFs, and other financial instruments, to satisfy the demand for shares in the holding company or fund or funds sold to investors in step 1304. The holding company may acquire and dispose of positions in the exchange-traded funds or other funds held in their portfolios through transactions directly with the funds in the case of certain conventional mutual funds, through creation unit size transactions with exchange-traded funds, or through transactions in the secondary market for traded financial instruments including exchange-traded funds. These purchases may be made at various prices throughout the trading day, or these transactions may be made using the net asset value (NAV) based trading system described above described above.

Figure 14:
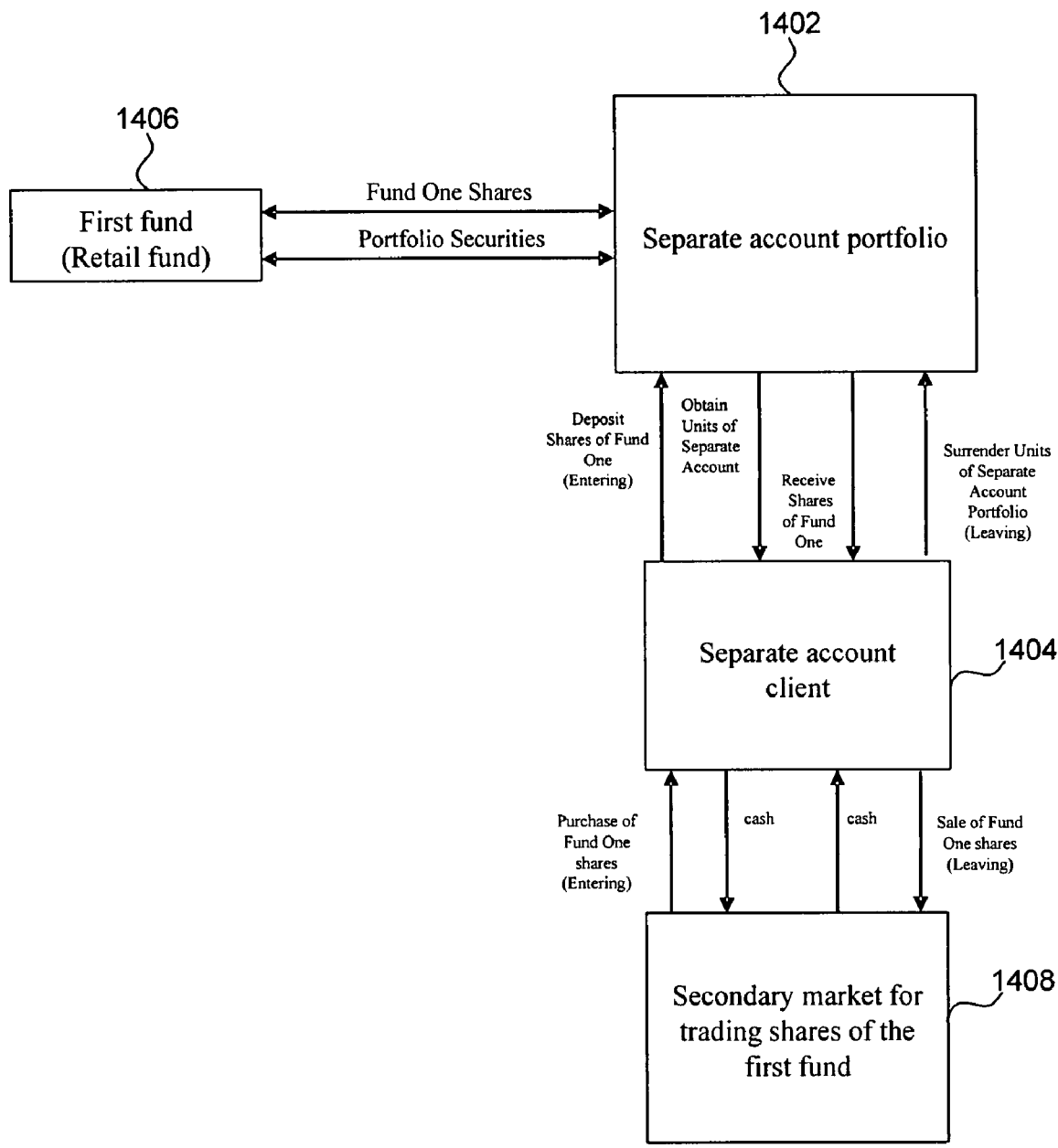
FIG. 14 illustrates an exemplary system for integrating funds and separate accounts with similar investment processes according to an embodiment of the present invention.

FIG. 14 illustrates an exemplary system 1400 for integrating a fund and a separate account with similar investment processes according to embodiments of the present invention. In the embodiment of FIG. 14, the separate account may include pooled or non-pooled accounts offered by some investment managers outside of registered investment companies. These investment managers may include, but are not limited to, insurance companies, banks and trust companies.

The exemplary system 1400 features a separate account portfolio 1402 and at least one separate account client 1404. The exemplary system 1400 also comprises a first fund 1406 that interacts with the separate account portfolio. The first fund may be an exchange-traded fund (ETF) such as exchange-traded fund 20 of FIG. 1, although the invention is not limited to this exemplary embodiment. In additional embodiments, first fund 1406 may be an exchange-traded fund, a closed-end fund, or a mutual fund, either alone or in combination. In a preferred embodiment, first fund 1406 may be a retail fund that is associated with a retail management fee and that may be purchased by investors in secondary market transactions, and a first fund portfolio 1406 and the separate account portfolio 1402 may be managed by the same adviser or by affiliated advisers using the same investment process.

In FIG. 14, the first fund portfolio 1406 and the separate account portfolio 1402 may exchange shares of the first fund 1406 for a basket of portfolio securities held in the two similar portfolios using an in-kind creation and redemption process similar to that outlined in FIG. 1, for example. In one embodiment, the first fund 1406 may receive shares of the first fund from the separate account portfolio 1402 and exchange these shares for a basket of securities representative of the first fund 1406 portfolio. The separate account portfolio 1402 may obtain shares in the first fund 1406 through a deposit of shares by an entering investor who purchases the shares as an efficient way to gain access to the separate account 1402. In the embodiment of FIG. 14, the entering investor may purchase shares of the first fund 1406 on a secondary market 1408 for trading the first fund shares.

In additional embodiments, the first fund 1406 may receive a basket of securities representative of the separate account portfolio 1402 in exchange for shares of the first fund 1406. The separate account portfolio 1402 may deliver the shares of the first fund 1406 to an investor, such as separate account client 1404, that is departing the separate account 1402, and the investor may sell the shares on the secondary market 1408 for the first fund shares.

The portfolio securities in the two portfolios may be very similar because the portfolios are managed by the same advisor or affiliated advisors using the same investment process. Further, in contrast to the non-transparent indexed or actively-managed exchange-traded fund creation or redemption basket, the basket of securities for the exchange consists of actual representative holdings of the portfolios that are using a common investment process, not posted creation and redemption portfolio composition files (PCFs) that may differ significantly from the actual portfolios. The baskets exchanged within exemplary system 1400 need not be a standard size like posted creation and redemption baskets.

The embodiment of FIG. 14 simplifies the calculation of consistent Global Investment Performance Standards (GIPS) performance data by managers with a diverse account base where accounts individually and collectively change in size as clients add and remove assets from their accounts. By calculating account performance after portfolio flow transaction costs are removed, performance consistent with GIPS is measured in a way that reflects the value of the manager's investment process without distortion from flows into and out of a portfolio. The use of the ETF creation and redemption process, as well as transfers of portfolio securities between and among portfolios and transactions in ETF shares to facilitate entry and removal of investor assets from a manager's investment process, is consistent with paragraph 3.B.2 of the GIPS standards (CFA Institute (2005)) which recommends the use of a temporary new account to remove the effect of a significant external cash flow.

While the embodiment of FIG. 14 indicates that the entering or leaving separate account client purchases and delivers shares or receives and sells shares in fund one, the transactions may be made for cash under conditions designed to protect other investors in the separate account from costs associated with investor entry to and exit from the separate account. Such conditions might include a commitment to a cash purchase or sale of an interest in the separate account with the client paying transaction charges calculated after the account implements transactions to accommodate the investment.

Furthermore, the actual transaction may be implemented by the investment manager, an affiliate of the investment manager or by an unaffiliated broker or dealer or investment manager in a variety of ways, as long as the objective of making the entering or leaving investor responsible for the costs of its entry or exit is achieved. The separate account client may act as or engage the services of an authorized participant, such as authorized participant 36 in FIG. 1, in the creation or redemption of shares in fund one to facilitate its entry to or exit from the separate account portfolio 61 or to increase or decrease the assets it has committed to the separate account portfolio. The steps taken to allocate the costs associated with transactions necessary to accommodate entering and leaving investors are designed to transfer the costs of entry and exit to the investors that are entering or leaving. The structures and processes illustrated herein provide a platform to accomplish a more appropriate allocation of costs associated with entry to and exit from a portfolio than techniques currently in use.

Figure 15:
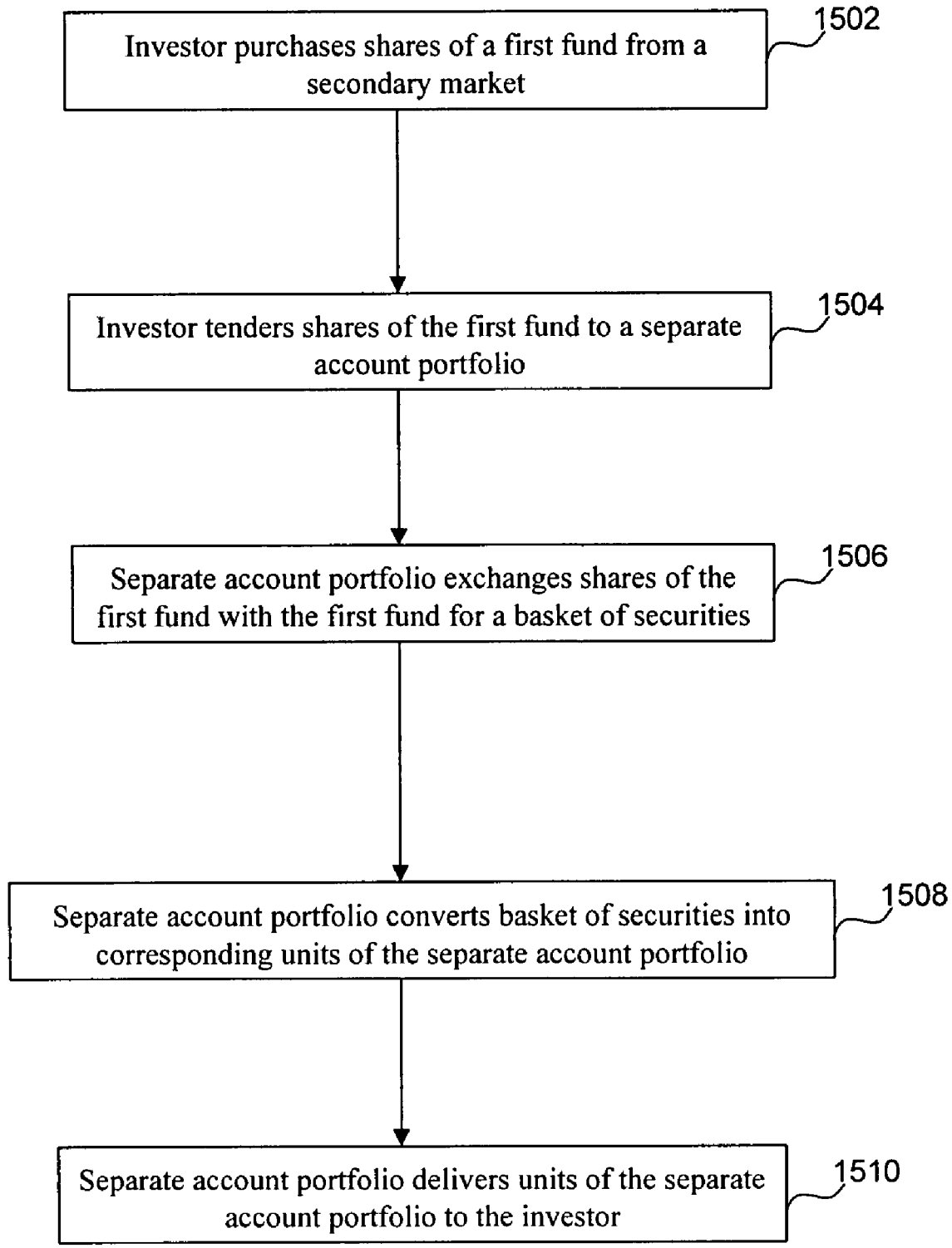
FIG. 15 illustrates an exemplary method for making an investment in a separate account according to an embodiment of the invention.

FIG. 15 illustrates an exemplary method 1500 for gaining access to a separate account according to an embodiment of the intention. In step 1502, an investor eligible to have a position in the separate account purchases shares of the first fund on a secondary market for trading the first fund shares. In a preferred embodiment, the first fund is an exchange-traded fund (ETF), such as exchange-traded fund 20 within FIG. 1, and the first fund may be a retail exchange-traded fund associated with retail management fees.

In step 1504, the investor tenders the newly-purchases shares of the first fund to the separate account portfolio 1402 of FIG. 14. The separate account portfolio accepts shares of the first fund and exchanges them for a basket of the first fund's portfolio securities using an in-kind ETF redemption process, such as that outlined in FIG. 1, for example 1506. The basket of securities is comparable in composition to the separate account portfolio. In step 1508, the separate account portfolio converts the basket of securities into corresponding units of the separate account portfolio, and units are then delivered to the entering investor in step 1510.

In accordance with the embodiments of FIG. 15, the investor gains access to the separate account portfolio by exchanging the shares in the first fund with the separate account portfolio that, in turn, exchanges them for portfolio securities from the first fund. The entering investor thus bears any transaction costs associated with its entry into separate account portfolio. If the separate account is a pooled account, the process assures appropriate allocation of entry and exit costs among investors in the account. Even if there is only one investor in the separate account, the exemplary method 1500 separates the effect of deposit of assets from the performance delivered by the investment management process.

Figure 16:
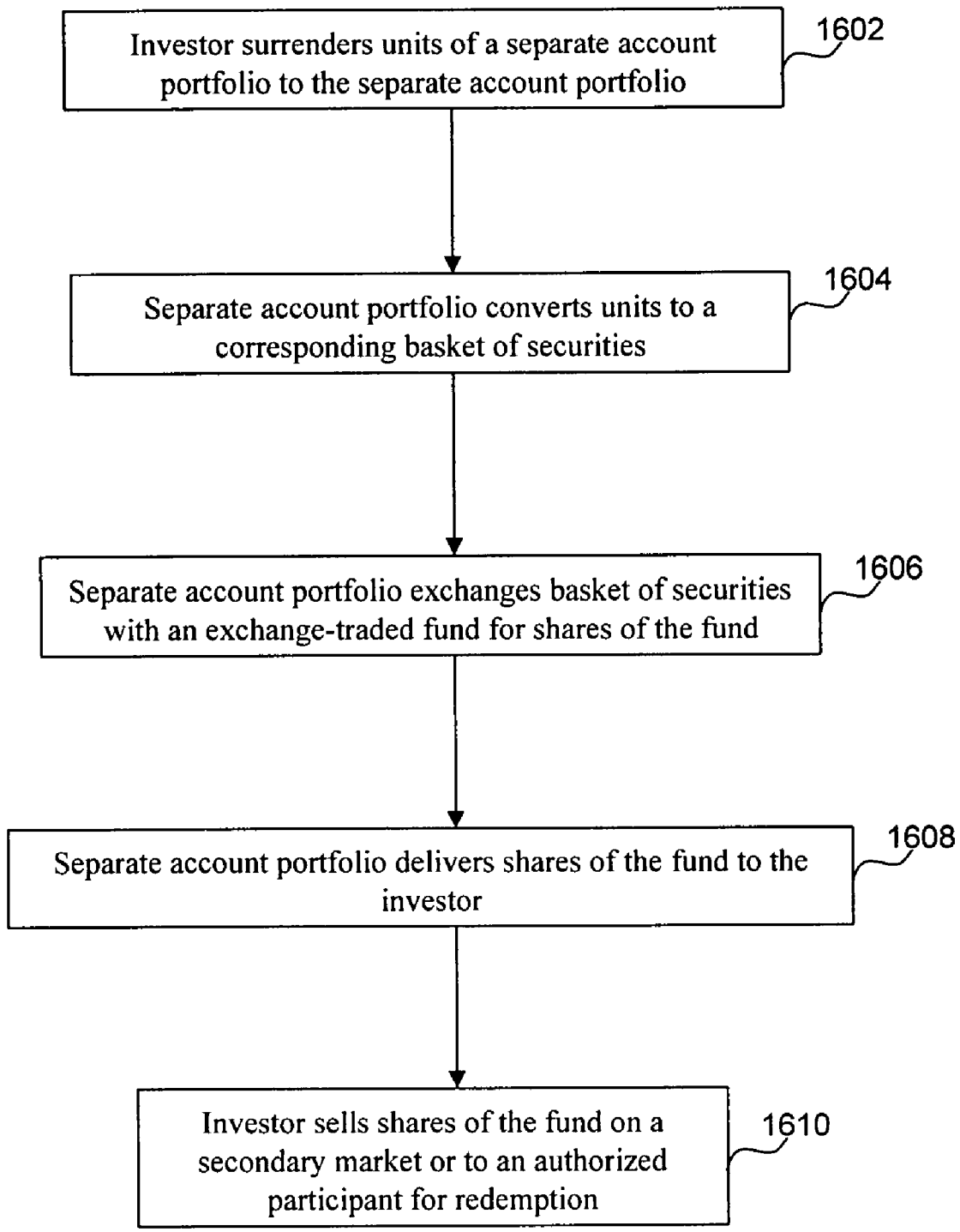
FIG. 16 illustrates an exemplary method for exiting a separate account according to an embodiment of the intention.

FIG. 16 illustrates an exemplary method 1600 for exiting a separate account according to an embodiment of the present invention. In step 1602, an investor in the separate account, such as separate account client 1404 in FIG. 14, surrenders a number of units in the separate account portfolio, such as separate account portfolio 1402 in FIG. 14.

In step 1604, the separate account portfolio converts the surrendered units on its books into a basket of securities representative of the separate account portfolio, and the separate account portfolio then exchanges the basket of securities with the first fund to obtain shares of the first fund in step 1606. The exchange between the first fund and the separate account portfolio is similar in some ways to the in-kind creation process for ETF shares outlined in FIG. 1, except that the number of shares exchanged for portfolio securities is not necessarily a fixed multiple of a creation unit, for example. In step 1608, the separate account portfolio delivers the shares of the first fund to the separate account client as compensation for its position in the separate account. In step 1610, the departing separate account client sells the shares of the first fund on a secondary market. Alternatively, the investor may sell the shares of the retail fund to an authorized participant, such as authorized participant 36 of FIG. 1, for redemption.

In accordance with the exemplary method 1600, the investor exits the separate account portfolio by exchanging units in the separate account for shares of the first fund. The exiting investor thus bears any transaction costs associated with its exit from separate account portfolio, and the other investors in the separate account are shielded from the transaction costs borne by the exiting investor. If the separate account is a pooled account, the process assures appropriate allocation of exit costs among investors in the account. Even if there is only one investor in the separate account, the exemplary method 1600 separates the effect of removal of assets from the account from the performance delivered by the investment management process. In accordance with the embodiments described herein, baskets of portfolio securities are exchanged by funds and separate accounts using a common investment process. These baskets of portfolio securities may differ from the standard posted creation and redemption baskets of the funds because they reflect the actual fund portfolios. The portfolio securities baskets exchanged between the two funds match the portfolio compositions of the two funds very closely. Unlike the published portfolio composition file (PCF), these baskets of securities and other financial instruments, including cash, need not be a fixed size in terms of fund shares and their contents are not usually made public at the time of the exchange. It is noted that the invention is not limited to any number of funds or accounts, such as the two funds/accounts described above. Other embodiments may use more than two funds/accounts.

According to the embodiments described herein, the investor gains access to the separate account by delivering shares of the first fund to the separate account portfolio, or departs from the separate account by receiving and selling shares of the first fund. In alternate embodiments, these transactions may be made for cash under conditions designed to protect investors in the separate account from costs associated with investor entry to and exit from the separate account. Such conditions might include a commitment to a cash purchase or sale of an interest in the separate account to be priced after the account has time to implement transactions to accommodate the investor. Furthermore, the actual transaction may be implemented by an investment manager, an affiliate of the investment manager or by an unaffiliated broker or dealer or investment manager in a variety of ways, as long as the objective of making the entering or leaving investor responsible for the costs of its entry or exit is achieved.

Exemplary Computer Systems

Figure 17:
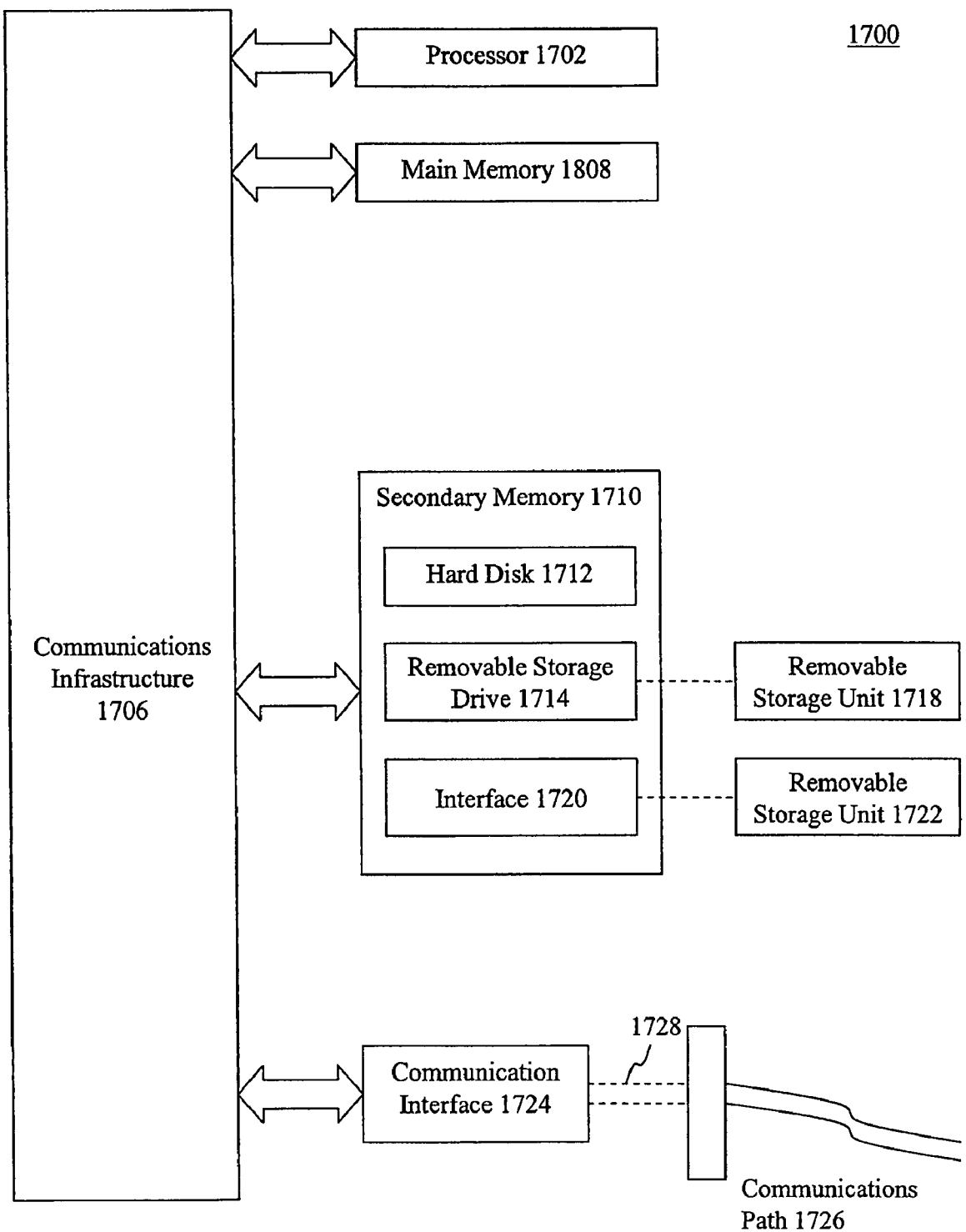
FIG. 17 is a block diagram of an exemplary computer connected to a network upon which the exemplary methods and systems of the present invention may be implemented.

FIG. 17 is a diagram of an exemplary computer system 1700 upon which embodiments of the present invention (or components thereof) may be implemented. The exemplary computer system 1700 includes one or more processors, such as processor 1702. The processor 1702 is connected to a communication infrastructure 1706, such as a bus or network. Various software implementations are described in terms of this exemplary computer system. After reading this description, it will become apparent to a person skilled in the relevant art how to implement the invention using other computer systems and/or computer architectures.

Computer system 1700 also includes a main memory 1708, preferably random access memory (RAM), and may include a secondary memory 1710. The secondary memory 1710 may include, for example, a hard disk drive 1712 and/or a removable storage drive 1714, representing a magnetic tape drive, an optical disk drive, etc. The removable storage drive 1714 reads from and/or writes to a removable storage unit 1717 in a well-known manner. Removable storage unit 1718 represents a magnetic tape, optical disk, or other storage medium that is read by and written to by removable storage drive 1714. As will be appreciated, the removable storage unit 1718 can include a computer usable storage medium having stored therein computer software and/or data.

In alternative implementations, secondary memory 1710 may include other means for allowing computer programs or other instructions to be loaded into computer system 1700. Such means may include, for example, a removable storage unit 1722 and an interface 1720. An example of such means may include a removable memory chip (such as an EPROM, or PROM) and associated socket, or other removable storage units 1722 and interfaces 1720, such as a memory stick or memory card, which allow software and data to be transferred from the removable storage unit 1722 to computer system 1700.

Computer system 1700 may also include one or more communications interfaces, such as communications interface 1724. Communications interface 1724 allows software and data to be transferred between computer system 1700 and external devices. Examples of communications interface 1724 may include a modem, a network interface (such as an Ethernet card), a communications port, a WIFI interface, a Bluetooth interface, a cellular interface, a PCMCIA slot and card, etc. Software and data transferred via communications interface 1724 are in the form of signals 1728, which may be electronic, electromagnetic, optical or other signals capable of being received by communications interface 1724. These signals 1728 are provided to communications interface 1724 via a communications path (i.e., channel) 1726. This channel 1726 carries signals 1728 and may be implemented using wire or cable, fiber optics, a wireless link and other communications channels. In an embodiment of the invention, signals 1728 comprise carrier waves modulated with control logic.

Any apparatus or manufacture comprising a computer useable or readable medium having control logic (software) stored therein is referred to herein as a computer program product or program storage device. This includes, but is not limited to, the computer 1700, the main memory 1708, the hard disk 1712, the removable storage units 1717, 1722 and the carrier waves modulated with control logic 1728. Such computer program products, having control logic stored therein that, when executed by one or more data processing devices, cause such data processing devices to operate as described herein, represent embodiments of the invention.

CONCLUSION

Embodiments of the present invention are directed to providing diverse groups of investors with ownership interests in portfolios in a variety of forms based on a single underlying portfolio or, more generally, a common investment process. The common investment processes may employ a pair (or more) of exchange-traded funds with similar portfolios that are managed by the same advisor or by affiliated advisors. Additionally, holding companies or funds of funds may hold shares in one or more funds and other financial instruments, and the funds of funds or holding companies may have expense structures and distribution arrangements useful to diverse groups of investors. Further, the common investment processes may employ a separate account and an open-end investment company that uses in-kind exchanges of portfolio securities for fund shares to increase or reduce fund or separate account assets.

The embodiments described herein assign the costs associated with transactions necessary to accommodate entering and leaving investors to the investors that are entering or leaving the funds and separate account portfolios. Further, the systems and methods disclosed herein mask the day-to-day changes in the portfolio and provide products familiar to and acceptable by most of the broad range of distribution channels utilized today by investment managers. The embodiments described herein also eliminate any need to charge the same effective management fee to all investors.

The embodiments described herein also rely on computer systems, such as those described with respect to FIG. 17, to integrate the investment and portfolio composition activity in the funds and separate accounts. Further, the embodiments described herein apply accounting techniques designed to control the consistency of the portfolio underlying each investor's position and the interactions and exchanges between or among funds and between fund and separate account portfolios.

It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the illustrations in the figures, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
calculating terms of transfer of portfolio holdings between a first portfolio and a second portfolio using at least one computer, wherein the first portfolio and the second portfolio comprise similar underlying financial instrument portfolios;
providing a second interest in the second portfolio to an investor in exchange for tender of a first interest in the first portfolio by the investor in order to enter the second portfolio, based at least on the calculated terms of transfer of portfolio holdings; and
allocating transaction costs of converting the first interest in the first portfolio into the second interest in the second portfolio to the investor;
wherein holdings of the second portfolio are creatable or redeemable at least through tender or receipt of interests in the first portfolio.

2. The method of claim 1, further comprising:
selecting the similar underlying financial instrument portfolios by an investment manager.

3. The method of claim 2, wherein a return of the second portfolio is used as a performance metric of selecting the similar underlying financial instrument portfolios by an investment manager.

4. The method of claim 1, wherein one or more sub-advisors manage part or all of the second portfolio.

5. The method of claim 1, wherein net fees associated with the first portfolio are different than net fees associated with the second portfolio.

6. The method of claim 1, wherein the first interest is represented by shares of a first exchange-traded fund and wherein the second interest is represented by shares of a second exchange-traded fund.

7. The method of claim 1, wherein the first interest is represented by fractional shares of a first investment company and wherein the second interest is represented by fractional shares of a second investment company.

8. A method comprising:
calculating terms of transfer of portfolio holdings between a first portfolio and a second portfolio using at least one computer, wherein the first portfolio and the second portfolio comprise similar underlying financial instrument portfolios;
providing a first interest in the first portfolio to an investor in exchange for tender of a second interest in the second portfolio by the investor in order to exit the second portfolio, based at least on the calculated terms of transfer of portfolio holdings; and
allocating transaction costs of converting the second interest in the second portfolio into the first interest in the first portfolio to the investor;
wherein holdings of the second portfolio are creatable or redeemable at least through tender or receipt of interests in the first portfolio.

9. The method of claim 8, further comprising:
selecting the similar underlying financial instrument portfolios by an investment manager.

10. The method of claim 9, wherein a return of the second portfolio is used as a performance metric of selecting the similar underlying financial instrument portfolios by an investment manager.

11. The method of claim 8, wherein one or more sub-advisors manage part or all of the second portfolio.

12. The method of claim 8, wherein net fees associated with the first portfolio are different than net fees associated with the second portfolio.

13. The method of claim 8, wherein the first interest is represented by shares of a first exchange-traded fund and wherein the second interest is represented by shares of a second exchange-traded fund.

14. The method of claim 8, wherein the first interest is represented by fractional shares of a first investment company and wherein the second interest is represented by fractional shares of a second investment company.

15. A computer-readable storage medium having stored thereon computer-executable instructions that, when executed by a computing device, cause the computing device to perform a method comprising:
calculating terms of transfer of portfolio holdings between a first portfolio and a second portfolio using at least one computer, wherein the first portfolio and the second portfolio comprise similar underlying financial instrument portfolios;
providing a second interest in the second portfolio to an investor in exchange for tender of a first interest in the first portfolio by the investor in order to enter the second portfolio, based at least on the calculated terms of transfer of portfolio holdings; and
allocating transaction costs of converting the first interest in the first portfolio into the second interest in the second portfolio to the investor;
wherein holdings of the second portfolio are creatable or redeemable at least through tender or receipt of interests in the first portfolio.

16. The computer-readable storage medium of claim 15, the method further comprising:

selecting the similar underlying financial instrument portfolios by an investment manager.

17. The computer-readable storage medium of claim 16, wherein a return of the second portfolio is used as a performance metric of selecting the similar underlying financial instrument portfolios by an investment manager.

18. The computer-readable storage medium of claim 15, wherein one or more sub-advisors manage part or all of the second portfolio.

19. The computer-readable storage medium of claim 15, wherein net fees associated with the first portfolio are different than net fees associated with the second portfolio.

20. The computer-readable storage medium of claim 15, wherein the first interest is represented by shares of a first exchange-traded fund and wherein the second interest is represented by shares of a second exchange-traded fund.

21. The computer-readable storage medium of claim 15, wherein the first interest is represented by fractional shares of a first investment company and wherein the second interest is represented by fractional shares of a second investment company.

22. A computer-readable storage medium having stored thereon computer-executable instructions that, when executed by a computing device, cause the computing device to perform a method comprising:
  calculating terms of transfer of portfolio holdings between a first portfolio and a second portfolio using at least one computer, wherein the first portfolio and the second portfolio comprise similar underlying financial instrument portfolios;
  providing a first interest in the first portfolio to an investor in exchange for tender of a second interest in the second portfolio by the investor in order to exit the second portfolio, based at least on the calculated terms of transfer of portfolio holdings; and
  allocating transaction costs of converting the second interest in the second portfolio into the first interest in the first portfolio to the investor;
  wherein holdings of the second portfolio are creatable or redeemable at least through tender or receipt of interests in the first portfolio.

23. The computer-readable storage medium of claim 22, the method further comprising:
  selecting the similar underlying financial instrument portfolios by an investment manager.

24. The computer-readable storage medium of claim 23, wherein a return of the second portfolio is used as a performance metric of selecting the similar underlying financial instrument portfolios by an investment manager.

25. The computer-readable storage medium of claim 22, wherein one or more sub-advisors manage part or all of the second portfolio.

26. The computer-readable storage medium of claim 22, wherein net fees associated with the first portfolio are different than net fees associated with the second portfolio.

27. The computer-readable storage medium of claim 22, wherein the first interest is represented by shares of a first exchange-traded fund and wherein the second interest is represented by shares of a second exchange-traded fund.

28. The computer-readable storage medium of claim 22, wherein the first interest is represented by fractional shares of a first investment company and wherein the second interest is represented by fractional shares of a second investment company.

29. A system comprising:
  a memory storing:
  a first module configured to calculate terms of transfer of portfolio holdings between a first portfolio and a second portfolio using at least one computer, wherein the first portfolio and the second portfolio comprise similar underlying financial instrument portfolios;
  a second module configured to provide a second interest in the second portfolio to investor in exchange for tender of a first interest in the first portfolio by the investor in order to enter the second portfolio, based at least on the calculated terms of transfer of portfolio holdings; and
  a third module configured to allocate transaction costs of converting the first interest in the first portfolio into the second interest in the second portfolio to the investor;
  wherein holdings of the second portfolio are creatable or redeemable at least through tender or receipt of interests in the first portfolio; and
  a processor configured to process the modules.

30. A system comprising:
  a memory storing:
  a first module configured to calculate terms of transfer of portfolio holdings between a first portfolio and a second portfolio using at least one computer, wherein the first portfolio and the second portfolio comprise similar underlying financial instrument portfolios;
  a second module configured to provide a first interest in the first portfolio to an investor in exchange for tender of a second interest in the second portfolio by the investor in order to exit the second portfolio, based at least on the calculated terms of transfer of portfolio holdings; and
  a third module configured to allocate transaction costs of converting the second interest in the second portfolio into the first interest in the first portfolio to the investor;
  wherein holdings of the second portfolio are creatable or redeemable at least through tender or receipt of interests in the first portfolio; and
  a processor configured to process the modules.

* * * * *